(12) United States Patent
Gormley et al.

(10) Patent No.: US 10,505,812 B1
(45) Date of Patent: Dec. 10, 2019

(54) METHOD AND SYSTEM FOR NEIGHBOR TIER COUNTING IN THREE DIMENSIONS

(71) Applicant: Nokia Solutions and Networks OY, Espoo (FI)

(72) Inventors: Eamonn Gormley, Bothell, WA (US); Vafa Ghazi-Moghadam, Seattle, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 121 days.

(21) Appl. No.: 15/076,539

(22) Filed: Mar. 21, 2016

Related U.S. Application Data

(63) Continuation of application No. PCT/US2015/052482, filed on Sep. 25, 2015, and a continuation of application No. PCT/US2016/015227, filed on Jan. 27, 2016.

(60) Provisional application No. 62/135,290, filed on Mar. 19, 2015, provisional application No. 62/055,580, filed on Sep. 25, 2014, provisional application No. 62/055,583, filed on Sep. 25, 2014, provisional application No. 62/108,482, filed on Jan. 27, 2015.

(51) Int. Cl.
| | |
|---|---|
| *H04W 4/00* | (2018.01) |
| *H04L 12/24* | (2006.01) |
| *H04W 24/02* | (2009.01) |
| *G06T 17/20* | (2006.01) |
| *H04W 36/00* | (2009.01) |

(52) U.S. Cl.
CPC ............ *H04L 41/12* (2013.01); *G06T 17/205* (2013.01); *H04W 24/02* (2013.01); *H04W 36/0061* (2013.01)

(58) Field of Classification Search
CPC ...... H04L 41/12; G06T 17/205; H04W 24/02; H04W 36/0061; H04W 4/029
See application file for complete search history.

(56) References Cited

U.S. PATENT DOCUMENTS

| | | | |
|---|---|---|---|
| 2004/0162082 A1 | 8/2004 | Bacceli et al. | |
| 2006/0259597 A1 | 11/2006 | Jiang et al. | |
| 2006/0287842 A1 | 12/2006 | Kim | |
| 2009/0011779 A1 | 1/2009 | MacNaughtan et al. | |
| 2010/0105415 A1* | 4/2010 | Ioppe ...................... | H04W 4/02 |
| | | | 455/456.3 |
| 2011/0090820 A1 | 4/2011 | Hussein et al. | |
| 2011/0136478 A1 | 6/2011 | Trigui | |
| 2012/0015665 A1* | 1/2012 | Farley ................... | G01S 5/0036 |
| | | | 455/456.1 |

(Continued)

OTHER PUBLICATIONS

Liu et al, "Seamless Service Handoff Based on Delaunay Triangulation for Mobile Cloud Computing", 2013, IEEE.*

(Continued)

*Primary Examiner* — Barry W Taylor

(57) ABSTRACT

Neighbor tier relationships between cells or base stations in a wireless network may be accurately determined by projecting a plurality of points representing the cells or base stations into three dimensional space along with a reference point, creating a plurality of polygons between the plurality of points including the reference point, and removing lines connected to the reference point. Each remaining line represents a first tier neighbor relationship between the two points it connects.

20 Claims, 25 Drawing Sheets

(56) References Cited

U.S. PATENT DOCUMENTS

| | | | |
|---|---|---|---|
| 2016/0029305 A1* | 1/2016 | Kim | H04W 24/02 370/311 |
| 2016/0161592 A1* | 6/2016 | Wirola | G01S 5/0252 702/150 |
| 2016/0192157 A1* | 6/2016 | Wirola | H04W 4/029 455/456.1 |

OTHER PUBLICATIONS

International Search Report and Written Opinion for International Application No. PCT/US2015/052482 dated Dec. 18, 2015.

* cited by examiner

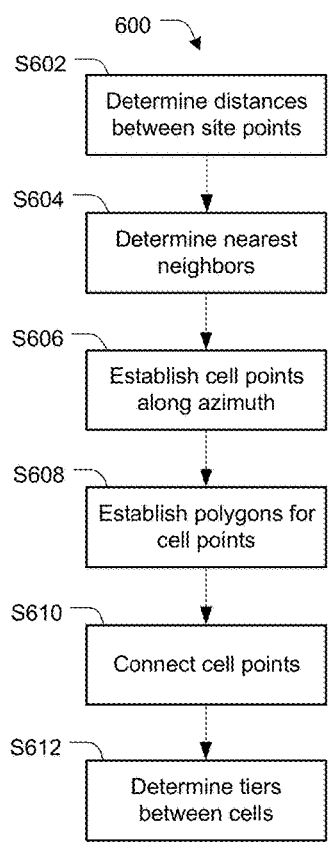
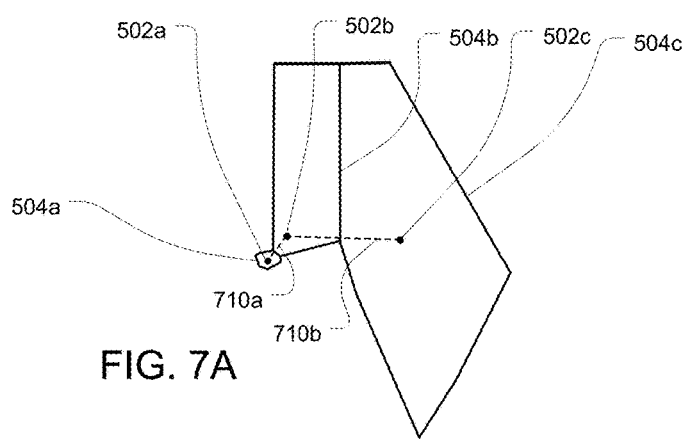
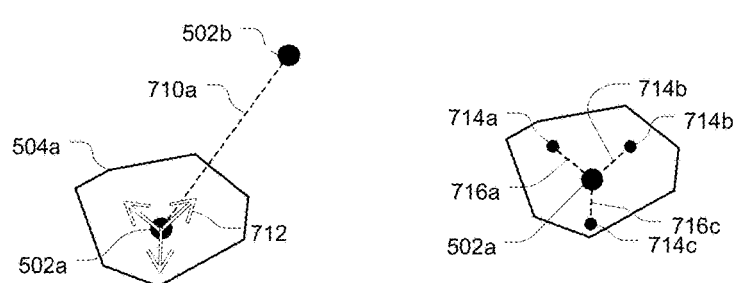
FIG. 6
FIG. 7A
FIG. 7B
FIG. 7C

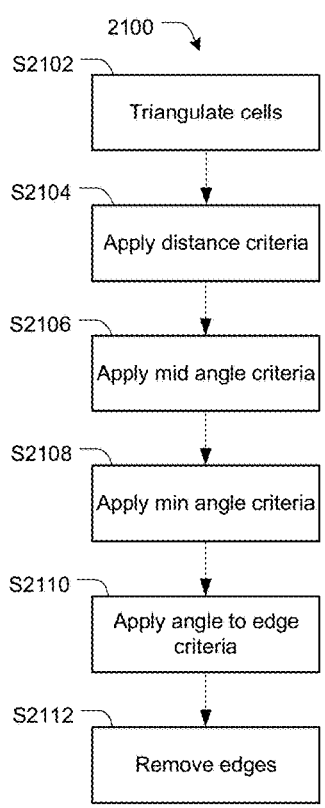
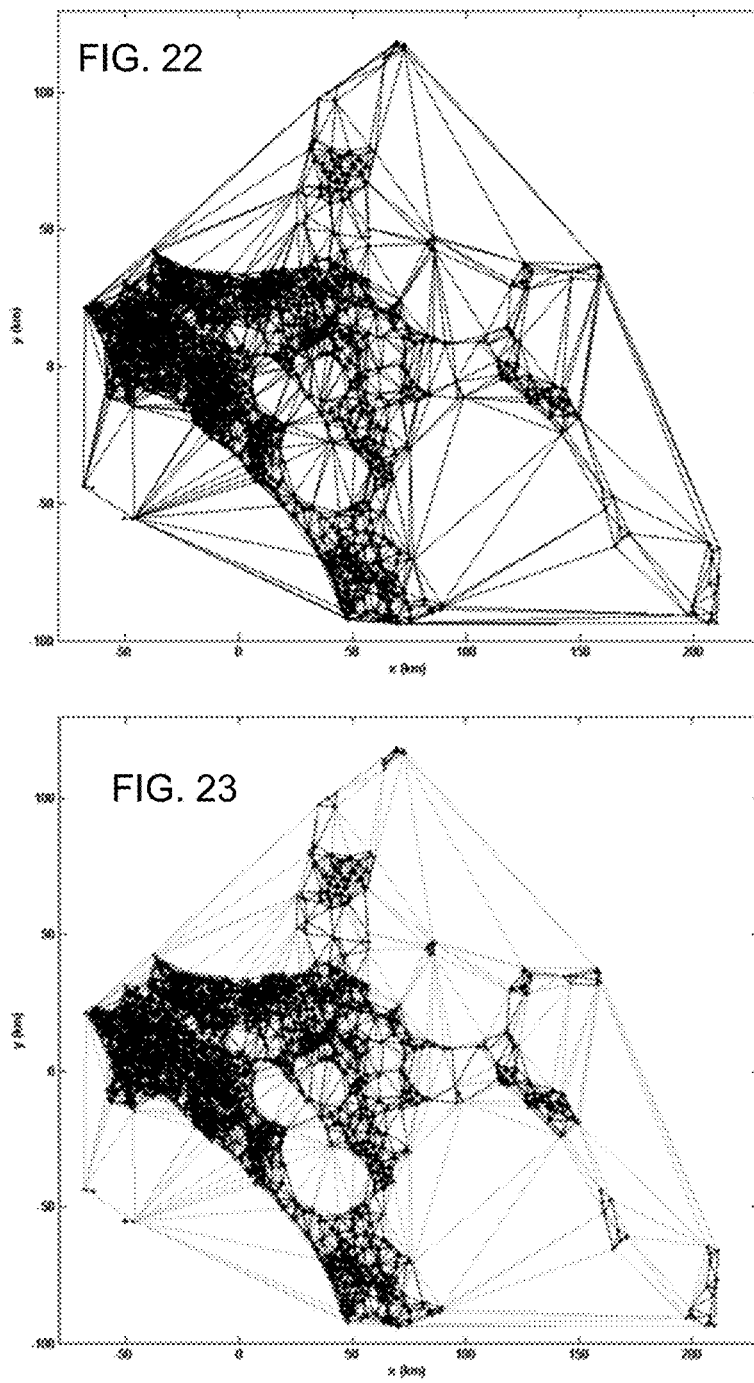
FIG. 22
FIG. 23
FIG. 21

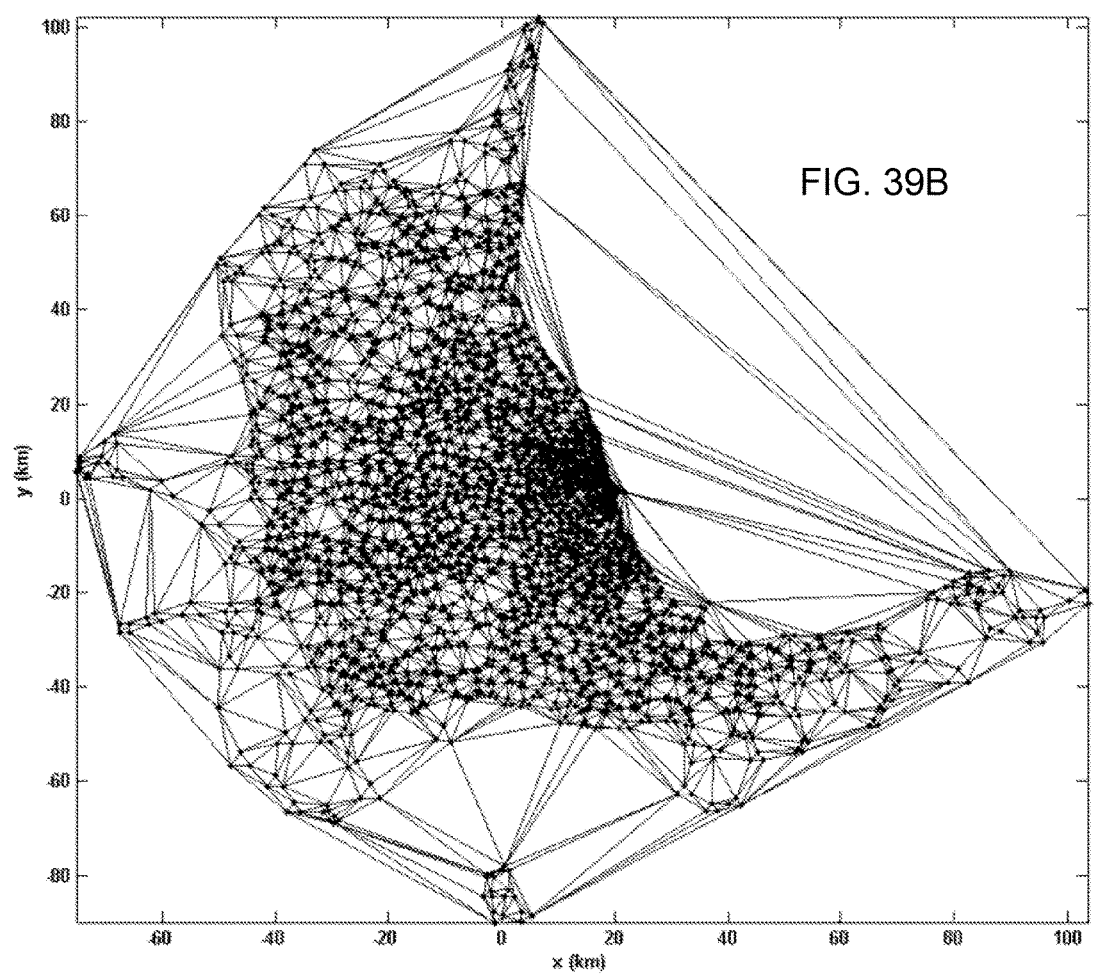

METHOD AND SYSTEM FOR NEIGHBOR TIER COUNTING IN THREE DIMENSIONS

CROSS-REFERENCES TO RELATED APPLICATIONS

The present invention claims priority to U.S. Provisional Application No. 62/135,290, filed Mar. 19, 2015 and to PCT Application No. PCT/US15/52482, filed Sep. 25, 2015, which in turn claims priority to U.S. Provisional Application No. 62/055,580, filed Sep. 25, 2014 and U.S. Provisional Application No. 62/055,583, filed Sep. 25, 2014. The present application also claims priority to PCT Application No. PCT/US16/15227, filed Jan. 27, 2016, which in turn claims priority to U.S. Provisional Application No. 62/108,482, filed Jan. 27, 2015, each of which are incorporated by reference herein for all purposes.

BACKGROUND

In order to serve the increased demand, wireless communication networks are becoming more diverse and complex, and subsequently are becoming more difficult to manage. A Self-Organizing Network (SON) simplifies and automates multiple processes to efficiently manage diverse communication networks.

Many SON algorithms require information about the coverage areas of cells in order to make better optimization decisions. However, it can be difficult to obtain cell coverage information for a network. Cell coverage information could be retrieved from the output of a network planning tool, but this information is not always available to a SON tool. In addition, network planning tools tend to use large amounts of data to determine cell coverage, so planning tools tend to be relatively slow and inefficient.

Typical algorithms attempt to estimate the coverage area of a source cell by identifying the closest cells in the network to the source cell and using information on the azimuth of the source cells to estimate a coverage distance for that cell. While these methods can produce acceptable results in networks where cells are laid out in a regular fashion, they tend to perform poorly in areas with an irregular placement of cells.

In addition, some algorithms have absolute distance thresholds in place to prevent against poor algorithmic decisions. For example, an Automated Neighbor Relations (ANR) algorithm may impose a maximum distance threshold beyond which cells are not added to neighbor lists. One problem with imposing such a threshold is that a single threshold is generally not suitable in all cases, especially when cell density varies.

For example, in rural environments, a large distance threshold such as 15 km may be suitable. However, if this threshold is used in an urban environment, distant cells may be added to the neighbor list of a source cell, resulting in poor system performance. In an urban environment, a distance threshold of 2 km to 4 km may be more suitable. However, if the distance threshold is set too low, neighbor cells may not be added, even though manual inspection shows that they should be.

Distance thresholds are generally applied to a large number of cells in a region such as all cells on a particular Radio Network Controller (RNC). While different distance thresholds may be applied on a per-cell basis, this is time consuming and error prone if done manually.

In practice, optimization engineers don't consider distances—instead, they look at cell tiers. Most RF engineers look at map and intuitively know how many tiers separate cells. However, it can be hard for an optimization engineer to provide a precise definition for a cell tier, or how to establish such a tier.

Most engineers will look at a map and make intuitive estimates about which cells are first tier neighbors of a source cell. Generally, these will be the closest cells to the source cells, with antenna pointing directions that are pointing towards the coverage area of the source cell. However, these intuitive decisions are difficult to translate into algorithms. Therefore, it is desirable to have an accurate and efficient tool that automates the tier counting process.

BRIEF SUMMARY

Embodiments of this disclosure provide a method and a system for automatically determining tier relationships between cells in a wireless telecommunications network. In an embodiment, cell points are established in three dimensional space along with a reference point, and a polygon mesh is applied to the cell points and the reference point. Edges that share the reference point are removed.

An embodiment of a method for determining relationships in a telecommunications network includes translating a plurality of cell points into three dimensional coordinates, establishing a reference point, creating a plurality of polygons connecting the plurality of cell points and the reference point, removing edges of polygons that connect to the reference point, determining a plurality of neighbor tier relationships from remaining polygon edges, and performing a handover operation or adjusting an antenna based on the plurality of neighbor tier relationships.

In an embodiment, creating the plurality of polygons includes performing Delaunay triangulation on the plurality of cell points and the reference point. In another embodiment, creating the plurality of polygons includes establishing a 3D convex hull using the plurality of cell points and the reference point. The cell points may represent cells of a cellular telecommunications network.

In an embodiment, a location of the reference point is outside of a space bounded by the cell points. Translating the plurality of cell points may include translating the plurality of cell points into points on a surface of a sphere. The reference point may be beneath the surface of the sphere, and may be the center of the sphere.

The cell points may represent base stations. In addition, translating the plurality of cell points may include converting latitude and longitude coordinates for the plurality of cell points into three dimensional coordinates, such as Cartesian coordinates.

In an embodiment, a process for determining neighbor tier relationships between cells in a wireless telecommunications network includes establishing a plurality of cell points, each cell point representing a cell of a plurality of cells in the wireless telecommunications network, forming a plurality of triangles, the vertices of each triangle of the plurality of triangles corresponding to respective cell points of the plurality of cell points, removing edges from a portion of the plurality of triangles, determining neighbor tier relationships between the plurality of cells using remaining triangle edges between the plurality of cell points, storing the neighbor tier relationships in a first memory, and using the neighbor tier relationships for handovers between the plurality of cells. Forming a plurality of triangles may include performing Delaunay triangulation on the plurality of cell points.

A process may include applying a length-based or angle-based criterion to identify triangle edges for removal, wherein the triangle edges identified for removal are longest edges of respective triangles. Removing edges from a portion of the plurality of triangles may include comparing lengths of triangle edges to a predetermined value, and triangle edges whose lengths exceed the predetermined value are the edges of the portion of the plurality of triangles that are removed.

In an embodiment, removing edges from a portion of the plurality of triangles includes determining a middle angle value of angles for each triangle and comparing the middle angle value to a predetermined value, wherein longest edges of the triangles whose middle angle values are less than the threshold value are the edges of the portion of the plurality of triangles that are removed.

In an embodiment, removing edges from a portion of the plurality of triangles includes determining a minimum angle value of angles for each triangle and comparing the minimum angle value to a predetermined value, wherein longest edges of the triangles whose minimum angles are less than the threshold value are the edges of the portion of the plurality of triangles that are removed.

In an embodiment, removing edges from a portion of the plurality of triangles includes determining lengths of the longest edges of the triangles, determining minimum angles of the triangles, determining ratios between respective longest edge lengths and respective minimum angles for each triangle, and comparing the ratios to a predetermined value, wherein longest edges of the triangles whose ratios are less than the threshold value are the edges of the portion of the plurality of triangles that are removed.

In an embodiment, a plurality of triangle edges are identified as candidates for removal before removing the edges, and triangles associated with the candidate edges are stored in a second memory. In an embodiment, the first memory and the second memory may be different locations in the same apparatus such as a network resource controller. In another embodiment, the first memory may be a first network equipment such as a base station, and the second memory may be in a second network equipment such as a SON controller.

In an embodiment, the method further comprises determining whether an edge of a first triangle that is a candidate for removal is shared with a second triangle, when the edge of the first triangle is shared with the second triangle, determining whether the second triangle has an edge that has been removed or is a candidate for removal and when the second triangle does not have an edge that has been removed or is a candidate for removal, retaining the shared edge.

In an embodiment, the method further comprises determining whether an edge of a first triangle that is a candidate for removal is shared with a second triangle, when the edge of the first triangle is shared with the second triangle, determining whether the second triangle has an edge that has been removed or is a candidate for removal, and when the second triangle has an edge that has been removed or is a candidate for removal, removing the shared edge from the first and second triangles. When the edge of the first triangle is not shared with the second triangle, the edge may be removed.

In an embodiment of this disclosure, a computer-implemented method for determining a neighbor tier relationship between first and second cells in a wireless communications network that includes a plurality of cell sites includes establishing respective cell site shapes for the plurality of cell sites including the first and second cells, each shape representing a coverage area of a corresponding cell site, establishing cell shapes for the cells of the plurality of cell sites, determining a tier relationship between the first and second cells based on a number of cell polygons between the first and second cells, and storing the tier relationship in a memory.

In an embodiment, establishing cell shapes for the cells of the plurality of cell sites includes determining cell points for cells of the plurality of cell sites and creating a second Voronoi diagram using the cell points as seeds. Establishing respective cell site shapes for the plurality of cell sites may include determining locations for each of the plurality of cell sites and creating a first Voronoi diagram using the cell site locations as seeds.

The method may further include determining cell points for cells of the plurality of cell sites. In such an embodiment, determining cell points for cells of the plurality of cell sites may include determining a distance from a first cell site of the plurality of cell sites to a nearest neighboring cell site and establishing cell points for the first cell site at locations that are a fraction of the distance from the first cell site. The fraction of the distance may be a value from 0.05 to 0.50, and the cell points may be established at azimuth directions for antennas of the first cell site. Furthermore, the nearest neighboring cell site may be determined by performing Delaunay triangulation on the plurality of cell sites, In an embodiment, the method may further include performing Delaunay triangulation on the cell points. Such an embodiment may further include determining first tier relationships between cells associated with the cell points by identifying cells that are connected by a single leg of triangles from the Delaunay triangulation as first tier neighbors. In addition, determining first tier relationships may be performed for all cells of the plurality of cell sites, and it may further include counting a number of first tier relationships between the first cell and the second cell, wherein the number of first tier relationships is the tier relationship between the first cell and the second cell.

In an embodiment, determining the tier relationship between the first and second cells includes determining a least number of triangle legs of the Delaunay triangles that connect the first cell to the second cell. The cell shapes and/or the cell site shapes may be Voronoi polygons. In an embodiment, the tier relationship between the first cell and the second cell is determined based on a lowest number of Voronoi polygons between the first and second cells.

Tier counting may include determining a lowest number of polygon edges that must be traversed between the first cell and the second cell, wherein the lowest number of polygon edges is a value of the tier relationship between the first and second cells.

In an embodiment, tier counting includes establishing a line between one of first or second cell points corresponding to the first and second cells or first or second cell sites corresponding to the first and second cells and determining a number of cell shapes that intersect with the line, wherein the number of cell shapes that intersect with the line is a value of the tier relationship between the first and second cells.

When a cell site uses an omnidirectional antenna, the cell point may be the location of the cell site. A method may further include updating a neighbor list based on the tier relationship.

BRIEF DESCRIPTION OF THE DRAWINGS

FIG. 6 illustrates a process for determining tier relationships between cells.

FIGS. 7A, 7B and 7C illustrate determining tier relationships between cells.

FIG. 21 illustrates a process for determining neighbor relationships according to an embodiment of the present disclosure.

FIG. 22 illustrates a plurality of cell points connected by Delaunay triangulation.

FIG. 23 illustrates a plurality of cell points connected by Delaunay triangulation in which selected edges are designated for removal.

FIGS. 39A and 39B illustrate tier relationships in a network.

DETAILED DESCRIPTION

In the following description, neighbor tiers are related to coverage area boundaries. In particular, two neighboring cells are first tier neighbors when their respective coverage areas share a common cell boundary. In addition, second tier neighbors have coverage areas that are separated by one other cell, while third tier neighbors have coverage areas that are separated by two other cells, and so on. This explanation is consistent with expectations from RF engineers for tier relationships.

This disclosure provides a method and system for determining the number of tiers separating cells in a cellular communications network. This information can then be used in algorithms for self-organizing networks, such as Automatic Neighbor Relations (ANR), Neighbor List Initialization, Coverage and Capacity Optimization (CCO), Reuse Code Optimization (e.g., Scrambling Code Optimization for UMTS networks, PCI Optimization for LTE Networks, BSIC optimization for GSM networks, etc.). Various cellular parameters may be changed in conjunction with these activities, such as transmit power and antenna tilt and direction.

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the purpose of clarity, technical material that is known in the technical fields related to this disclosure has not been described in detail so that the disclosure is not unnecessarily obscured.

Figure 1:
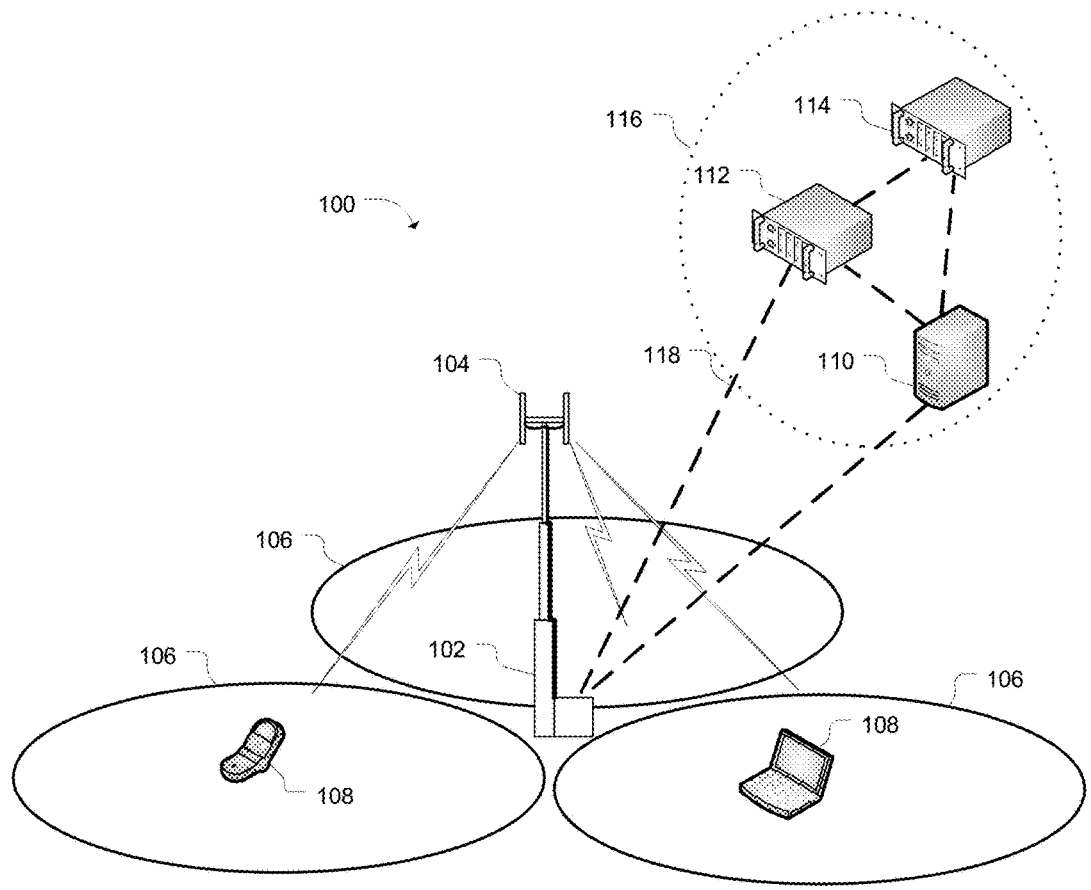
FIG. 1 illustrates a wireless communications system according to an embodiment.

FIG. 1 illustrates a networked communications system 100 according to an embodiment of this disclosure. System 100 may include one or more base stations 102, each of which are equipped with one or more antennas 104. Each of the antennas 104 may provide wireless communication for user equipment 108 in one or more cells 106. As used herein, the term "base station" refers to a wireless communications station provided in a location and serves as a hub of a wireless network. For example, in LTE, a base station may be an eNodeB. The base stations may provide service for macrocells, microcells, picocells, or femtocells. In this disclosure, the term "cell site" may be used to refer to the location of a base station.

The one or more UE 108 may include cell phone devices, laptop computers, handheld gaming units, electronic book devices and tablet PCs, and any other type of common portable wireless computing device that may be provided with wireless communications service by a base station 102. In an embodiment, any of the UE 108 may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

The system 100 may include a backhaul portion 116 that can facilitate distributed network communications between backhaul equipment 110, 112 and 114 and the one or more base station 102. As would be understood by those skilled in the Art, in most digital communications networks, the backhaul portion of the network may include intermediate links 118 between a backbone of the network which are generally wire line, and sub networks or base stations located at the periphery of the network. For example, cellular user equipment (e.g., UE 108) communicating with one or more base station 102 may constitute a local sub network. The network connection between any of the base stations 102 and the rest of the world may initiate with a link to the backhaul portion of a provider's communications network (e.g., via a point of presence).

In an embodiment, the backhaul portion 102 of the system 100 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base station 102) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Any of the network controller devices 110, 112 and 114 may be a dedicated Network Resource Controller (NRC) that is provided remotely from the base stations or provided at the base station. Any of the network controller devices 110, 112 and 114 may be a non-dedicated device that provides NRC functionality among others. In another embodiment, an NRC is a Self-Organizing Network (SON) server. In an embodiment, any of the network controller devices 110, 112 and 114 and/or one or more base stations 102 may function independently or collaboratively to implement processes associated with various embodiments of the present disclosure.

In accordance with a standard GSM network, any of the network controller devices 110, 112 and 114 (which may be NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110, 112 and 114 (optionally having NRC functionality) may be associated with a NRC, a serving GPRS support node (SGSN), or any other common network controller device known in the art, such as an RRM. In accordance with a standard LTE network, any of the network controller devices 110, 112 and 114 (optionally having NRC functionality) may be associated with an eNodeB base station, a mobility management entity (MME), or any other common network controller device known in the art, such as an RRM.

In an embodiment, any of the network controller devices 110, 112 and 114, the base stations 102, as well as any of the UE 108 may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110, 112 and 114 or any of the base stations 102 may employ any number of common server, desktop, laptop, and personal computing devices.

Figure 2:
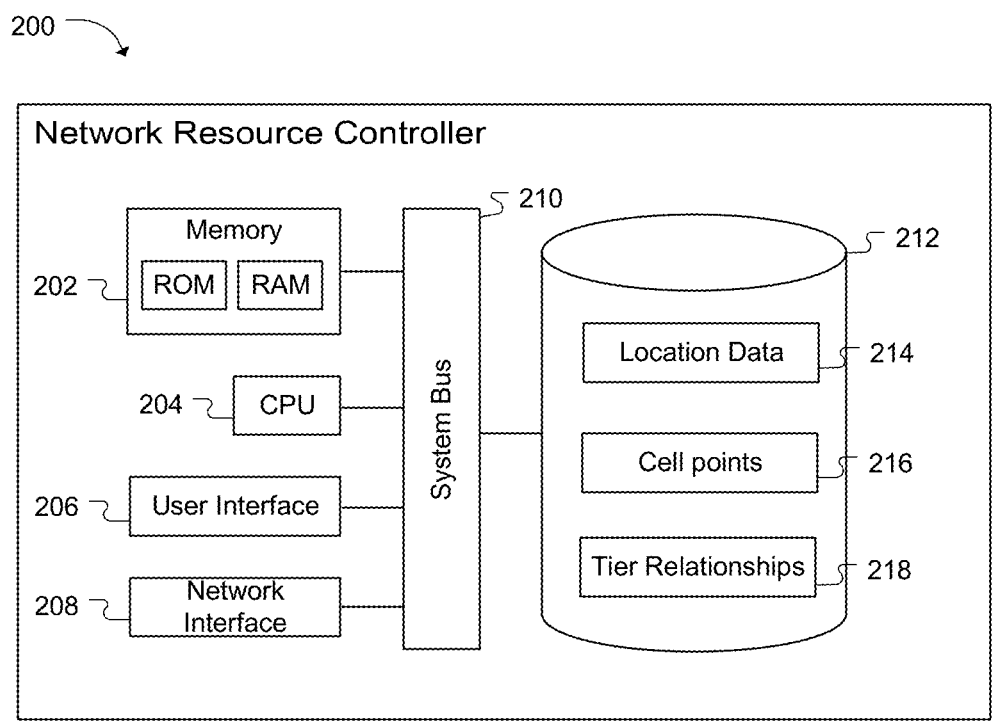
FIG. 2 illustrates a network resource controller according to an embodiment

FIG. 2 illustrates a block diagram of an NRC 200 that may be representative of any of the network controller devices 110, 112 and 114. Accordingly, NRC 200 may be representative of a Network Management Server (NMS), an Element Management Server (EMS), a Mobility Management Entity (MME), or a SON server. The NRC 200 has one or more processor devices including a CPU 204.

The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. Storage device 212 may store, for example, location data 214, cell points 216, and tier relationships 218.

The NRC 200 may also include a user interface 206 that allows an administrator to interact with the NRC's software and hardware resources and to display the performance and operation of the system 100. In addition, the NRC 200 may include a network interface 206 for communicating with other components in the networked computer system, and a system bus 210 that facilitates data communications between the hardware resources of the NRC 200.

In addition to the network controller devices 110, 112 and 114, the NRC 200 may be used to implement other types of computer devices, such as an antenna controller, an RF planning engine, a core network element, a database system, or the like. Based on the functionality provided by an NRC, the storage device of such a computer serves as a repository for software and database thereto.

Neighbor tier counting is facilitated by establishing boundaries for individual cells. Determining the coverage area of each cell facilitates establishing cell boundaries. There are a number of ways in which this can be accomplished.

Cell boundaries can be established using an RF planning tool or from measurements in a deployed network, such as drive test measurements or data from a geolocation tool. RF planning tools can make a determination of which cells are first tier neighbors of each other. Second, third and subsequent tier neighbors may be determined through various relationships. However, this level of RF planning tool information is not always available to a SON tool, and even when it is, the amount of time and resources, including processor resources, for providing such information makes it difficult to provide current coverage information in a timely manner.

In addition, in the case of a customer trial, operators may be reluctant to provide information from their planning tools, which typically includes sensitive data.

Drive test and Geolocation data could be used to make determinations of cell coverage area. However, there are drawbacks to making tier determinations using drive test or geolocation information. For example, such information requires that networks be already deployed. However some SON algorithms (e.g., neighbor list initialization) use neighbor tier separation data prior to a cell being deployed. Thus, this data is not available in some situations.

Drive test data requires physical presence in various geographic locations which may not be practically accessible. Accordingly, drive test data is generally not available for all parts of the network. In addition, an operator may not have deployed a geolocation solution in their network.

On the other hand, SON tools are generally provided with cell site information such as cell location including cell latitude and longitude, whether cell is deployed indoors or outdoors, antenna azimuth (pointing direction), and antenna height information. Using this information alone, it is possible to make an estimate of cell coverage areas and use this information to determine cell boundaries, first tier neighbor cells, etc. Embodiments of such a process and a system that implements the process are provided by this disclosure.

Figure 3:
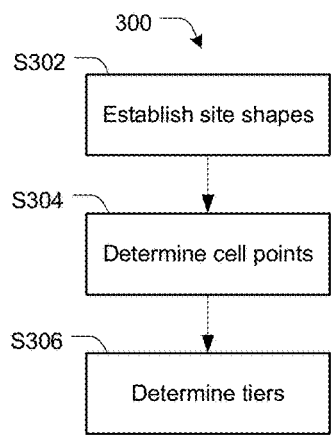
FIG. 3 illustrates an automatic tier counting process according to an embodiment.

FIG. 3 illustrates a general process 300 for determining neighbor tier relationships for cells. Elements of process 300 will be explained in more detail with respect to subsequent figures and processes.

In process 300, shapes are established at S302 for cell sites, which may correspond to the location of a base station, such as a cellular tower for a macrocell. The cell site shapes may be used to establish cells S304, which may be represented as points, shapes, or both in various embodiments. For example, a cell point may be a centroid of a cell shape, a base station location for cases such as a femtocell with an omnidirectional antenna, or a point a certain distance along an azimuth from a base station. In an embodiment with an omnidirectional antenna, a site shape may be the same as a cell shape. After cells are established, neighbor tier relationships between cells are determined at S306.

Figure 4:
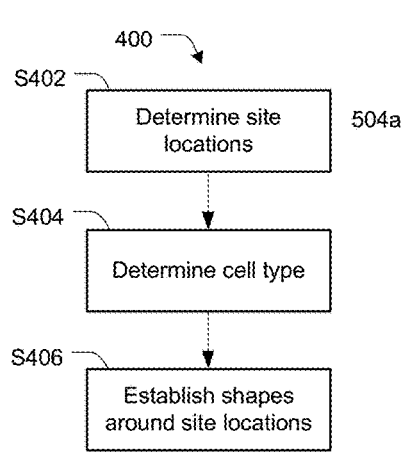
FIG. 4 illustrates a process for establishing a shape around a cell site.

FIG. 4 shows a process S400 for establishing a shape around a cell site. Locations for cell sites in a cellular network are determined at S402. A location for a cell site may be latitude and longitude values for the cell site. The cell site locations may be maintained in a database, which may be a pre-existing database of a SON server in a specific embodiment. Such a database may be updated as new cell sites are deployed, and processes according to embodiments of this disclosure may be performed periodically so that neighbor tier relationships are accurate as the network evolves.

Neighbor tier relationships may be stored in a memory by one or more network device. For example, neighbor tier relationships may be stored by a base station 104 and/or a network resource controller 200 for use with various network operations.

Network planning teams generally select cell sites to have a coverage area in all directions around the cell site. This is particularly true for Macro cell deployments. Typically, the locations closest to a cell site are served by that cell site.

Cell types for the cell sites are determined at S404. Various types of cells have different characteristics, and an embodiment may account for one or more characteristic when creating a shape for the site at S406. For example, the coverage area of a femtocell is substantially smaller than the coverage area of a macrocell, so different techniques may be employed when establishing a femtocell shape compared to establishing a macrocell shape. Examples of how cell types may influence establishing shapes S406 are provided in more detail below with respect to FIGS. 11A, 11B and 13A.

Shapes are established around the site locations at S406. Establishing shapes S406 will be explained with respect to FIG. 5A, which shows shapes in a regular (e.g. evenly spaced) deployment, and FIG. 5B, which shows a deployment with varying site density. The shapes in FIGS. 5A and 5B are Voronoi polygons established using Voronoi diagrams.

For a given set of points, a Voronoi diagram divides an area into regions around a plurality of points, or seeds, in such a way that each point in a region is closest to its seed. If the seeds are cell sites, then resulting regions are polygons that provide a useful approximation of the coverage area of a cell site. While the resulting polygons are not exact representations of the coverage area of each site, the boundary of the polygons can be used as indication of the first tier neighbor sites of each site.

Figure 5A:
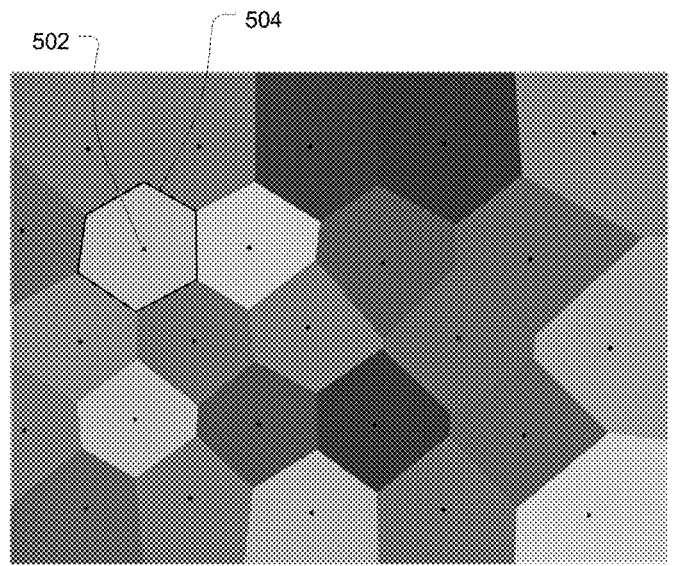
FIG. 5A illustrates site locations as shapes in a regular deployment.

An example of a set of sites 502 and the Voronoi polygons 504 for those sites is shown in FIG. 5A. Depending on the layout of the sites 502, the polygons may have various numbers of sides. Highly efficient algorithms have been developed for creating Voronoi polygons around data points, which can be employed in embodiments of this disclosure.

Figure 5B:
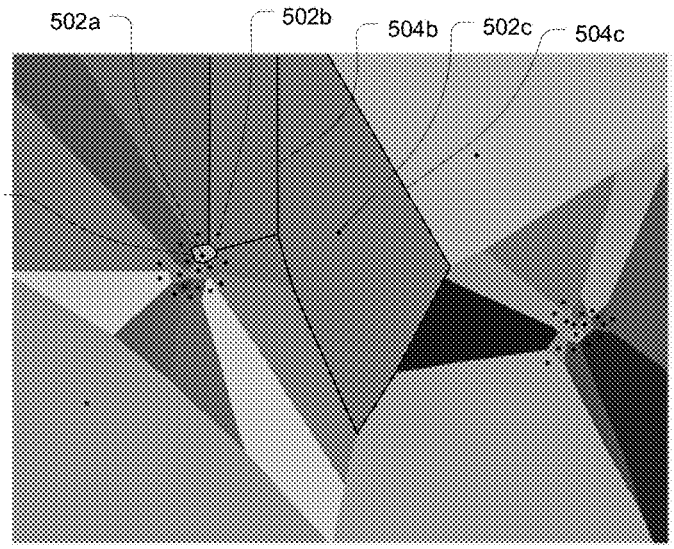
FIG. 5B illustrates site locations as shapes in a variable density deployment.

FIG. 5B shows a Voronoi diagram of a variable density site scenario. This example is representative of a high density site deployment around two small urban areas, with rural sites in between.

FIG. 5B illustrates an advantage of an embodiment of this disclosure over a distance-based approach. While a distance-based approach may recognize that site 502a is a neighbor of site 502b, the distance-based approach may not recognize that site 502c is a neighbor of site 502b because there is a substantial distance between them. However, for mobility purposes, site 502c is a first-tier neighbor of site 502b, and cells associated with site 502c will accept handovers from cells associated with site 502b.

In the Voronoi diagrams of FIG. 5A and FIG. 5B, first tier site neighbors are those that share a common polygon edge. Second tier neighbors are those that have a common first tier neighbor, and so on.

Instead of calculating polygon edges, the first tier neighbors can be determined via Delaunay triangulation. For a first point (site) 502, Delaunay triangulation directly provides the points (sites) 502 that have Voronoi polygon edges that are adjacent to the polygon edges of the first point.

FIG. 6 shows a process 600 for determining tier relationships between cells. In process 600, distances between site points are determined at S602. FIG. 7A shows the three cell sites 502a, 502b and 502c from FIG. 5. In FIG. 7A, the distance between cell sites 502a and 502b is represented by line 710a, and the distance between sites 502b and 502c is represented by line 710b.

In an embodiment, determining distances between site points may be accomplished by performing Delaunay triangulation to all site locations in a network area. The resulting mesh from a Delaunay triangulation of the site points may effectively determine distances between all neighboring cell sites, where a length of a triangle leg between points corresponds to a distance between the points.

The nearest neighbor site for each cell site may be determined at S604. Such a determination may be made, for example, by comparing the lengths (distances) of all triangle legs from a Delaunay triangulation with a vertex at a target cell site. For example, if cell site 502b of FIG. 7A is a target site, then comparing 710a to 710b returns a result that the nearest neighbor is cell site 502a. For convenience, this disclosure may represent the distance to the nearest neighbor of a target cell site as variable dminSite.

A typical cellular telecommunications network includes a large number of eNodeB base stations as cell sites. An eNodeB base station is typically configured to provide three co-sited cells for a given set of frequencies to establish 360 degrees of coverage around the base station. Accordingly, an eNodeB typically has three antennas to serve the co-sited cells, and each antenna has an azimuth that is separated from azimuths of the other two antennas.

Cell points 714 are established along azimuth lines of each cell site 502 at S606. If cell points are chosen so that they are equidistant from the site location, then when Voronoi polygons are subsequently provided for the cell points, the resultant polygon edges between adjacent cells at the same site will bisect the azimuths of each cell. If the cell points are close to the site point, then the resulting polygons from the Voronoi diagram of the cell points are similar to segmented versions of the site polygons. If the cell points overlap the site point, then the polygons of the cell points will be very similar to a polygon of the site point.

A suitable distance for locating cell points along azimuth lines at S606 may be determined by finding the closest first tier site and taking a fraction of this distance. In general, the fraction should be less than 0.5, which is half of the distance dminSite between the site and its closest first tier neighbor site, in order to avoid locating the cell point in the coverage area of an adjacent cell. Values from 0.05 to 0.3 have been found to work well in practice. Each cell point is then set along the azimuth line of that cell, where the distance from the site 502 is the chosen fraction of the distance between the site 502 and the site of its closest neighbor (dminSite).

FIGS. 7B and 7C illustrate some of the elements of steps S604 and S606. For example, FIG. 7B shows a polygon 504a for cell site 502a, and line 710a represents the distance dminSite between cell site 502a and cell site 502b as shown in FIG. 7A. In addition, FIG. 7B shows cell azimuth directions 712, which are represented by arrows oriented in the respective pointing directions of three corresponding antennas of cell site 502a.

FIG. 7C shows a result of performing process S606 to the embodiment of FIG. 7B. In particular, cell points 714a, 714b and 714c are established at distances along the azimuth lines 716a, 716b and 716c, respectively. The distances used in FIG. 7C correspond to about 0.25, or 25%, of the original distance dminSite of minimum distance 502b.

In another embodiment, different cell points of a cell site may be located at different distances from the cell site origin. For example, consider FIG. 7A, in which cell site 502b is neighbored by site 502a in one direction and site 502c in another direction. Cell site 502c is substantially farther from site 502b than site 502a. In order to account for this discrepancy, an embodiment may use different dminSite values for each azimuth of a cell site 502.

For example, an embodiment may determine a nearest neighbor from neighboring sites that are found within an arc segment centered around an azimuth line and projecting outward from the origin cell site, and determine different dminSite values based on distances to neighbors for each separate azimuth. Such an embodiment may be employed, for example, when neighbor tiers are counted using ray trace techniques or other techniques that are more sensitive to cell point shapes than relational techniques such as edge sharing techniques.

Shapes are created around cell points at S608. Creating shapes around cell points may be performed by establishing Voronoi polygons using cell points as the seed values for the polygons.

Figure 8A:
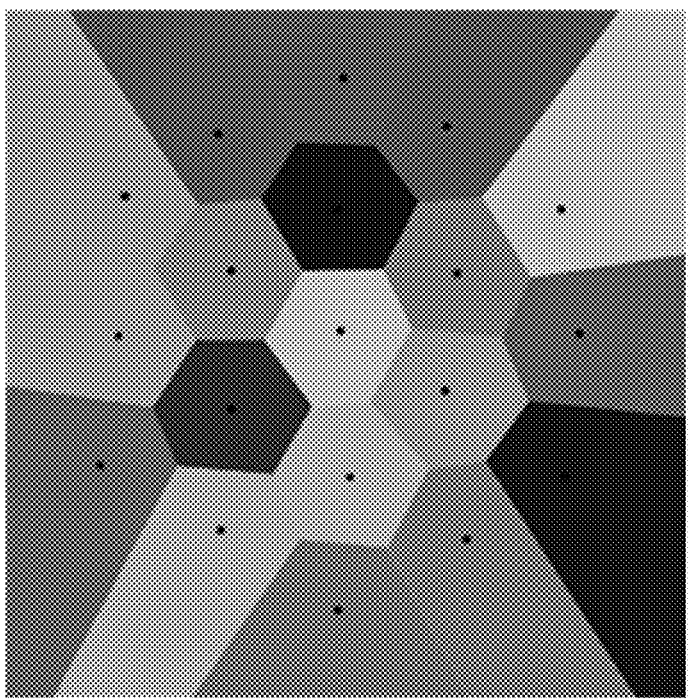
FIG. 8A is a Voronoi diagram of cell sites.
Figure 8B:
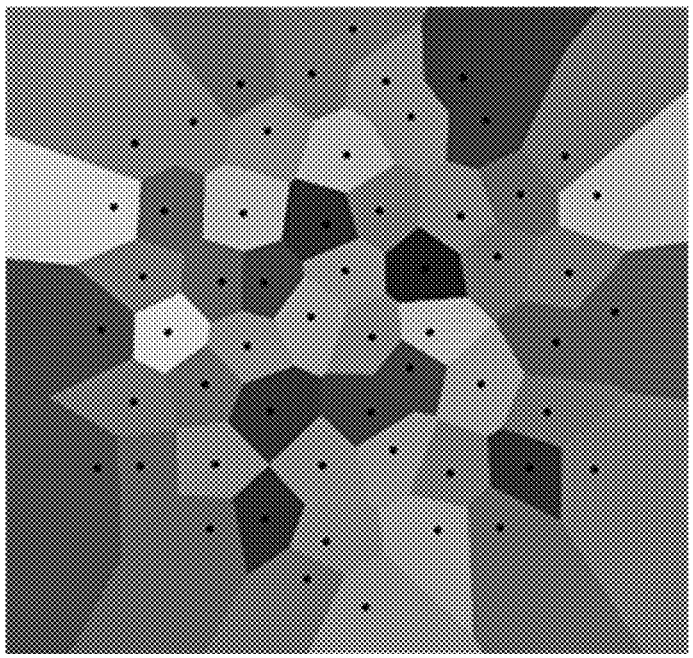
FIG. 8B is a Voronoi diagram of cell points.

FIGS. 8A and 8B show a difference between a Voronoi diagram for cell sites and a Voronoi diagram for cell points. In particular, FIG. 8A is a Voronoi diagram showing Voronoi polygons around a plurality of cell sites. FIG. 8B is a cell point diagram that was established by determining distances to nearest neighbors for each cell site, projecting azimuth values onto the cell site locations of FIG. 8A, and locating cell points at a fraction of 0.25 of the minimum neighbor distance dminSite along the azimuth lines for each site. In other words, FIG. 8A represents a result of an embodiment of a process 400, while FIG. 8B represents a result of an embodiment of step S608 of process S600.

Depending on the technique employed for tier counting, certain embodiments may not perform step S608. For example, triangulation techniques establish links between cell points, so it may not be necessary to establish shapes for cell points when tiers are counted using triangulation. In contrast, ray trace and shared edge techniques use polygons for cell points to determine tier relationships.

Cell points may be connected to one another at S610. In an embodiment, each cell point is connected to its nearest neighbors using Delaunay triangulation. Delaunay triangulation is a useful technique for establishing connections between neighboring cells in the same way that network engineers understand neighbor relationships. Delaunay triangulation is useful to automate a process that returns meaningful and accurate results.

Tier relationships between cell points are determined at S612. Embodiments of determining tier relationships are discussed in detail below.

Figure 9:
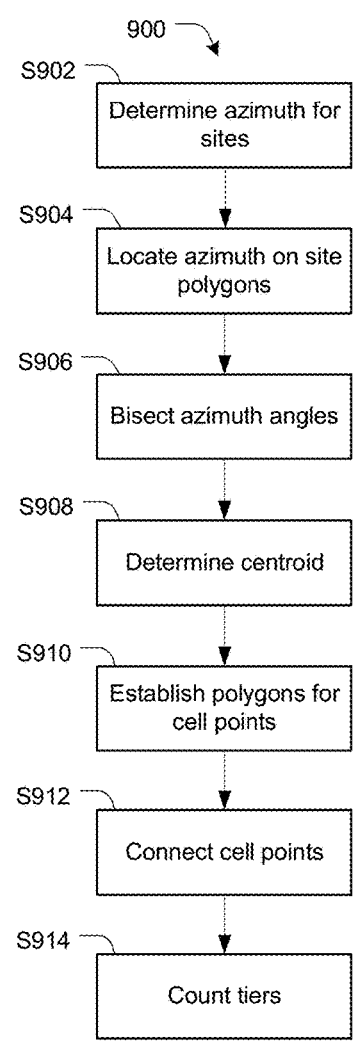
FIG. 9 illustrates a process for determining tier relationships between cells.

FIG. 9 illustrates an embodiment of a process 900 for determining tier relationships between cells that is a different from process 600 of FIG. 6. At S902, azimuth values are determined for cell sites. As discussed above, a macrocell site typically serves three cells, so when a site is a macrocell site, S902 may determine three azimuth directions. In an embodiment, azimuth values for a cell site are determined by retrieving data from a database of azimuth directions.

Figure 10A:
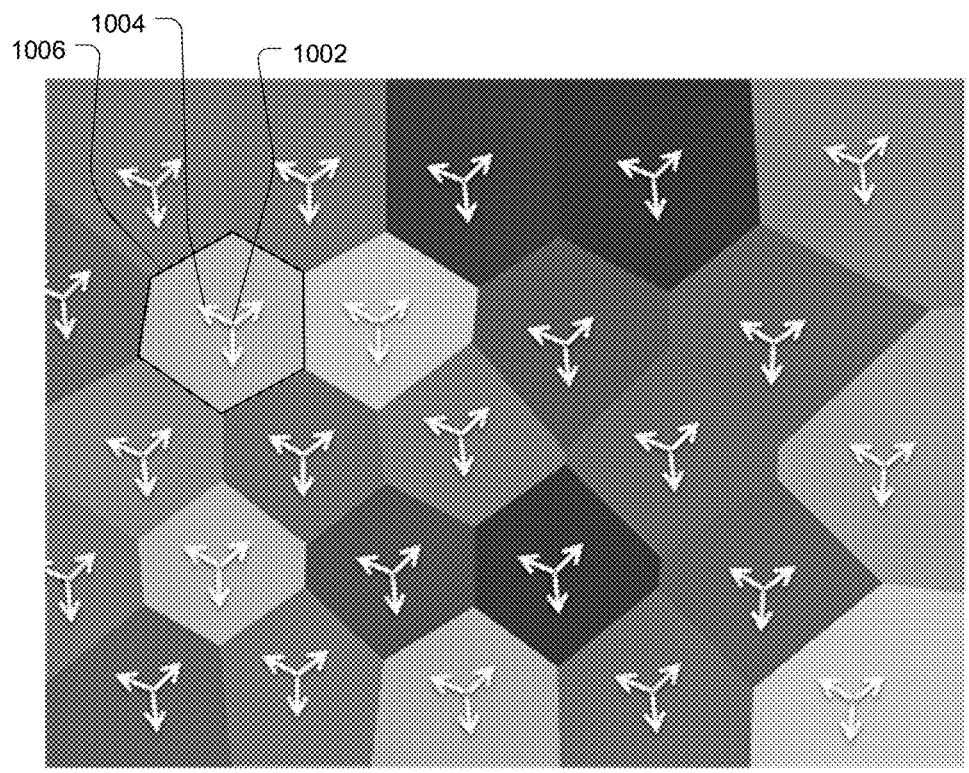
FIGS. 10A and 10B illustrate determining tier relationships between cells.

The azimuth directions are located on a site polygon at S904. FIG. 10A shows azimuths 1004, which are represented as rays emanating in different directions from the cell site location 1002, projected onto a site polygon 1006. In an embodiment, azimuth lines 1004 are extended to the edges of polygons 1006. However, the angular component of the azimuth is used at S906, so embodiments may project rays emanating in directions from cell sites 1002 instead of lines with two points. Although there are three arrows in azimuths 1004 which represent a typical macrocell site, other macrocell sites may serve different numbers of cells, so the numbers of azimuth rays may be adapted to correspond to the number of cells served by a site within a particular technology and frequency range.

Figure 10B:
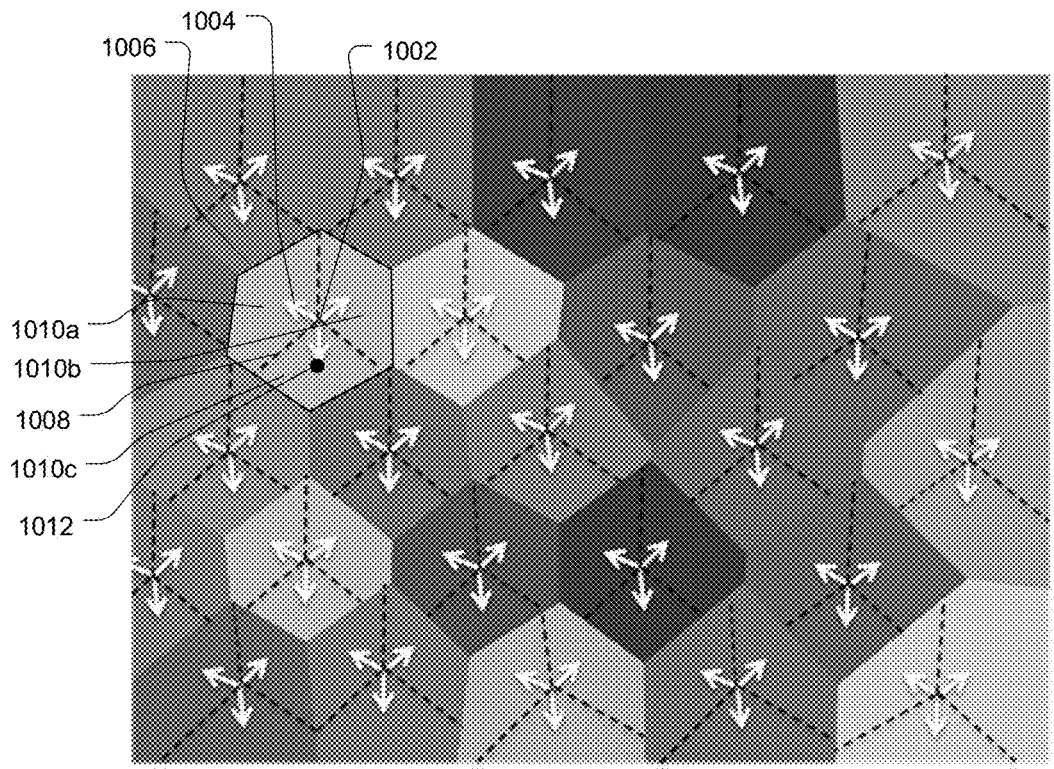

As seen in FIG. 10B, angles between two adjacent azimuth rays 1004 are bisected by lines 1008 at S906, which are shown as dashed lines in the figure. Bisecting the azimuths 1004 can be may be accomplished by determining an angle between two azimuth rays, and establishing line 1008 at an angle that is about halfway between the two azimuth rays, with endpoints of the line at the cell site 1002 and an edge of the site polygon 1006. The polygons 1010 that result from S906, which include lines defining the edges of site polygon 1006 and the bisected azimuth lines 1008, are representative of cells that are served by cell site 1002. The cell polygons around cell site 1002 are represented as polygons 1010*a*, 1010*b*, and 1010*c* in FIG. 10B.

In an embodiment, a centroid 1012 is established for each respective cell polygon 1010 at S908. The centroid 1012 for a cell polygon 1010 may represent a cell point for the polygon.

After centroids 1012 are established at S908, polygons may be established for the cell points 1012 at S910 by creating a Voronoi diagram of the cell points. However, other embodiments may not perform S910, and may count tiers based on cell polygons 1010 from S906 or centroids 1012. Similarly, cell points may optionally be connected at S912 by Delaunay triangulation depending on the manner in which tiers are counted. Tiers are then counted at S914, for example by counting shared edges, ray tracing, etc.

In FIGS. 10A and 10B, each base station provides three cells, as indicated by the three azimuth directions 1004. However, some cell sites do not have three antennas. For example, sites for femtocells may have an omnidirectional antenna, while other cell sites may provide other numbers of cells. Accordingly, processes and systems according to this disclosure may determine a type of base station associated with cell types and apply rules to process 600 or process 900 that are specific to the cell type.

Processes 600 or 900 may be applied to all cells in a network. This may lead to an over-estimate of the number of tiers between cells in some cases. When smaller cells with less than 360 degree coverage, or indoor cells are also deployed in a network, then different processes may be applied when establishing shapes for such cell sites at S406. For example, in some embodiments, different shapes or weighting may be used for certain types of cells.

For example, if there is a Pico cell between two Macro cells, then typical a Voronoi diagram makes the Pico cell first tier neighbors of each Macro cell, but may make the macro cells second tier neighbors of each other, when they should be first tier neighbors. Such an embodiment is shown in FIGS. 11A and 11B.

Figure 11A:
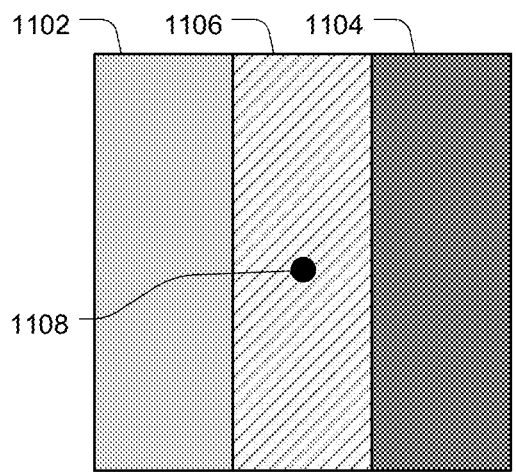
FIGS. 11A and 11B illustrate determining shapes based on cell type.

FIG. 11A shows an embodiment of a Voronoi diagram of shapes around cell points 1108. The shape 1106 in the middle represents a pico cell with low transmit power, and the polygons 1102 and 1104 on the left and right represent macro cells. The resulting Voronoi diagram is as shown in FIG. 11A.

The situation in FIG. 11A may lead to an over-estimate of the number of tiers between two cells in some cases. FIG. 11A shows a result of applying Voronoi polygons to macrocells 1102 and 1104 as well as picocell 1106. However, the relationships in FIG. 11A may not accurately represent relationships between the cells from a user mobility perspective. For example, while FIG. 11A requires transiting across cell 1106 to move from cell 1102 to cell 1104, in an actual physical space, UE may handover from cell 1102 directly to cell 1104 without interacting with picocell 1106.

Figure 11B:
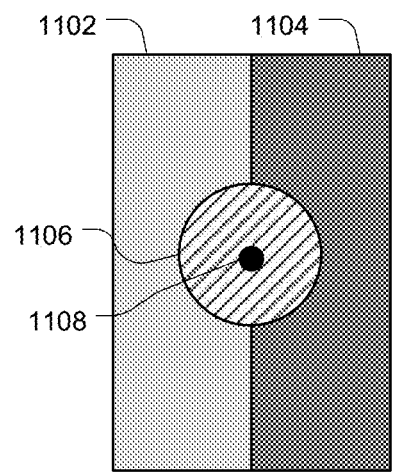

FIG. 11B illustrates a picocell 1106 located between two macrocells 1102 and 1104. As shown in FIG. 11B, the polygon representing cell 1102 shares edges with the polygon representing cell 1104. In an embodiment, sharing a shape edge indicates a first-tier neighbor relationship. Accordingly, the embodiment of FIG. 11B is a more accurate representation of cell tier relationships than FIG. 11A. In another embodiment, when the cell site 1108 for picocell 1106 is closer to a cell site of a macrocell, the circle representing picocell 1106 in FIG. 11B may be located entirely within an area of a macrocell shape, representing a relationship in which the picocell is only a first tier neighbor to that macrocell.

FIG. 11B shows an example of establishing a circular shape for a cell site at S406 when S404 determines that the cell type of cell site 1108 is a picocell. The shape used to represent omnidirectional antennas may be a circle. Other embodiments may use various shapes to more accurately represent coverage areas of different types of base stations and deployment scenarios. Other shapes that may be used for these cells include a wedge shape, a triangle, a circle, an oval, and combinations of these and other shapes.

Specific shapes may be applied to certain cell types and deployment scenarios separately from creating polygons for other cells using a Voronoi diagram at S406. For example, an embodiment of S406 may include first establishing Voronoi polygons for macrocells, and second applying specific shapes, which may be weighted polygons.

In some embodiments, weighting may be applied based on a cell type or a deployment scenario. Weighting may be applied to a general polygon from a Voronoi diagram, or a specific shape for a cell type. Factors that may be used to apply weighting to a shape include the type of cell, the transmit power, the antenna height, and location characteristics, such as whether the cell site is indoors or outdoors.

Weighting may be applied in many different ways. In an embodiment, cell weights may be scaled to a coverage area or transmit power of a cell type. For example, a macrocell may be weighted more than a microcell, which may in turn be weighted more than a picocell. Other characteristics that may be assigned different weights include power, antenna height, and environment. For example, higher power cells may be weighted more than lower power cells, higher antenna heights may be weighted more than lower antenna heights, and outdoor deployments may be weighted more than indoor deployments. Persons of skill in the Art will recognize that other cell characteristics can influence the size of representative shapes in other embodiments.

In another embodiment, one or more cell shape may be established using a power diagram. The size of shapes in the power diagram may be adapted according to weighting based on cell characteristics as described above. The weighting may be applied through a multiplicatively weighted diagram, and additively weighted diagrams may be suitable as well.

Other cell characteristics that may be evaluated to determine a shape and/or a size of a shape include the Radio Access Technology (RAT) and frequency layers of a cell. In general, the neighbor tiers will be determined for cells of a particular RAT (e.g., GSM, UMTS, LTE) that operate on the same frequency. However, depending on the application, neighbor tier counting can also be implemented for cells of different types. For example, first tier inter-RAT neighbors may be determined using the approaches in this disclosure by calculating the Delaunay triangulation and/or Voronoi polygons for cells of another technology.

Figure 12:
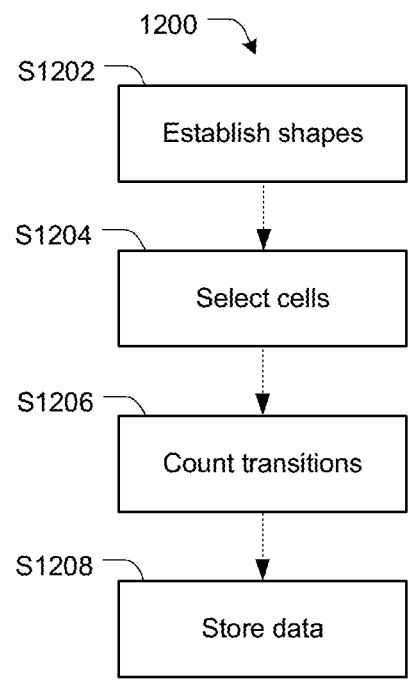
FIG. 12 illustrates a process for determining tier relationships between cells.

FIG. 12 illustrates a process 1200 for determining a tier relationship between two cells. FIG. 12 is an example of counting tiers, and corresponds to S914, S612 and S306.

Shapes are established at S1202. In one embodiment, shapes are established in accordance with S608 as Voronoi polygons around cell points. In another embodiment, shapes are established by bisecting azimuth lines of cell sites in accordance with S910. Accordingly, process 1200 may be performed using shapes that were established from various embodiments.

Cells for which tier relationships are determined are selected at S1204. Tier relationships may be determined for all cells in a network, for cells in a particular area, or for two or more specific cells. Thus, two or more cells may be selected at S1204.

In an embodiment, when a new cell is installed, tier relationships for the new cell and its neighbors may be determined. In addition, a new cell may affect tier relationships for pre-existing cells in an area around the new cell. Therefore, tier relationships for all cells in an area around a new cell may be selected at S1204.

One way of counting the tiers between neighbor cells is to find the minimum number of cells that have to be traversed to get from the coverage area of a first cell to the coverage area of a second cell. This may be accomplished, for example, by counting transitions between cells at S1206. An embodiment of counting transitions between cells is shown in FIG. 13A.

Figure 13A:
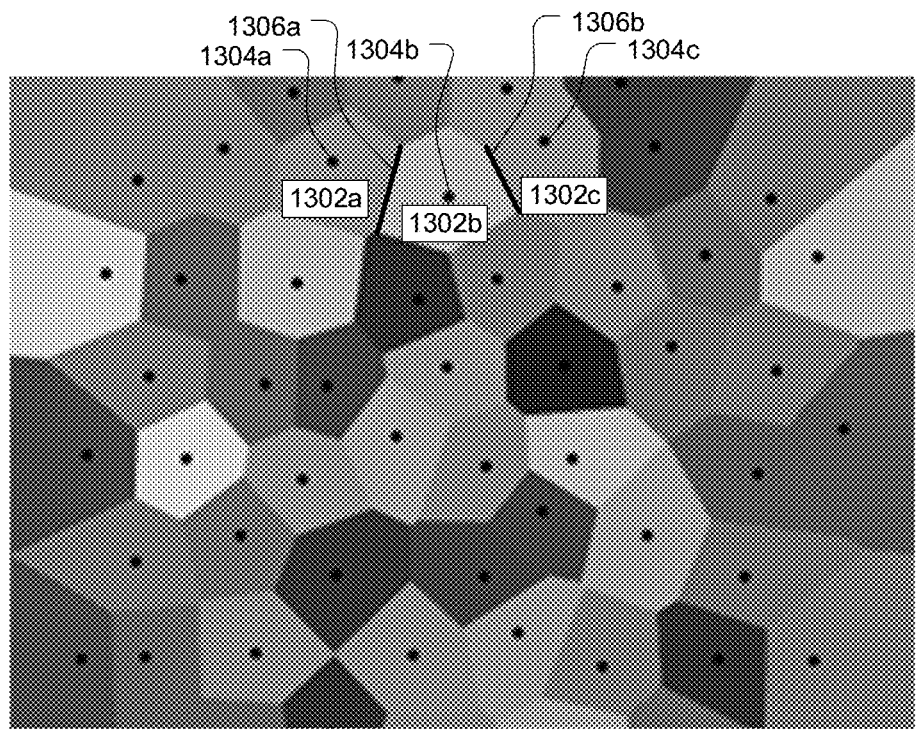
FIGS. 13A and 13B illustrate determining tier relationships between cells.

FIG. 13A shows a plurality of cell shapes 1302 that are established around cell points 1304. In FIG. 13A, neighbor tier relationships are determined between a first cell corresponding to cell shape 1302a and a second cell corresponding to cell shape 1302c. There are two cell shape boundaries 1306 between first cell shape 1302a and second cell shape 1302c. Each of the cell shape edges 1306 corresponds to a transition between adjacent cells. Therefore, performing S1206 on cells 1302a and 1302b results in a single transition, or cell shape edge 1306a, between the cells, so cell 1302a is a first tier neighbor of cell S1302b.

Similarly, two cell shape edges 1306a and 1306b lie between cell shapes 1302a and 1302c. Accordingly, the cell that corresponds to cell shape 1302a is a second tier neighbor of the cell that corresponds to cell shape 1302c. In an embodiment, an efficient algorithm such as Dijkstra's algorithm may be employed to determine a minimum number of edges between selected cells at S1206.

After tier relationships are determined by counting transitions at S1206, the tier relationships are stored in a database at S1208. The tier relationships may be transmitted to and stored by network equipment, where it may subsequently be used to perform a variety of network activities. While tier relationships may be stored by a SON server at S1208, tier relationships may also be stored by other network equipment such as an RRM, a base station, and UE.

Figure 13B:
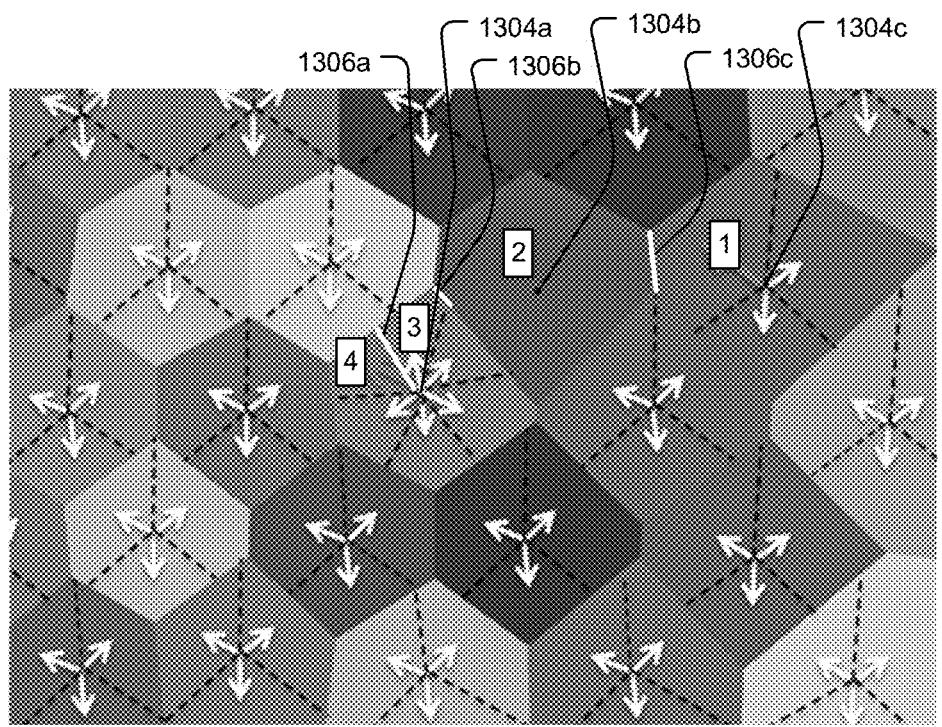

FIG. 13B shows another embodiment of process 1200 that includes two variations from three sectored macrocells. In particular, the base station that serves cell 2 uses an omni-directional antenna, so cell 2 is represented as a single polygon around cell site 1304. Cell 1 is associated with a three sector macrocell site 1304c, but cells 3 and 4 are associated with a cell site 1304a that has six antennas that provide service for six respective cells. Therefore, six cell polygons are established around cell site 1304a.

Applying process 1200 to FIG. 13B, cells 1 and 4 are selected at S1204. S1206 counts three transitions 1306a, 1306b and 1306c between cells 1 and 4. The transitions are defined by cell shape boundaries. The tier relationship between cells 1 and 4 corresponds to the number of transitions, or boundaries, between the cells, so cell 1 is established as a third tier neighbor of cell 4.

Figure 14:
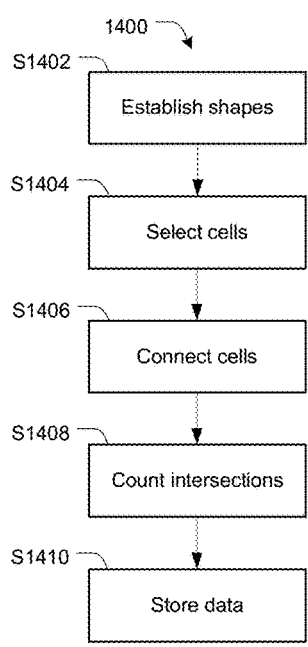
FIG. 14 illustrates a process for determining tier relationships between cells.

FIG. 14 shows a process 1400, which is another embodiment of determining a tier relationship between cells. Establishing cell shapes S1402 and selecting cells S1404 may be performed in the same fashion as S1202 and S1204 above, so a detailed description of these elements will be omitted for the sake of brevity.

Figure 15:
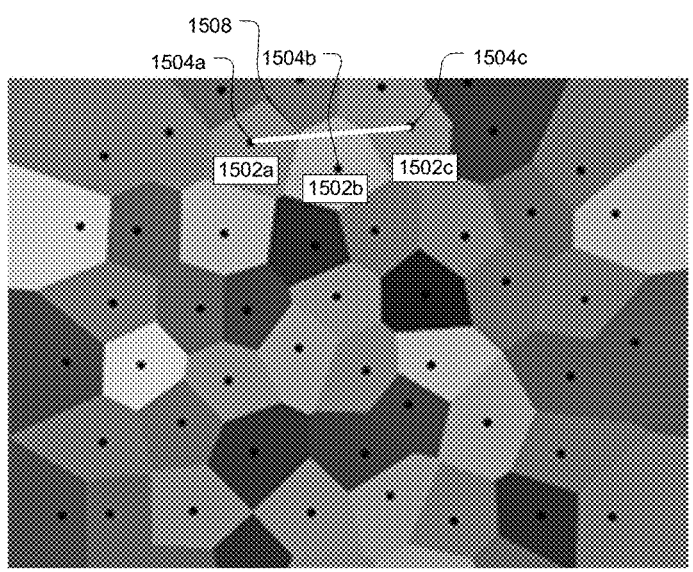
FIG. 15 illustrates tier relationships between cells.

The selected cells are connected at S1406. For example, FIG. 15 shows an example of a Voronoi diagram of a plurality of cell shapes 1502, in which cell shape 1502a and cell shape 1502c correspond to the selected cells. The selected cells are connected by a line 1508, which FIG. 15 shows as being projected onto a Voronoi diagram of cells in a network.

Although FIG. 15 shows the end points of line 1508 being cell points 1502, the end points of the line may be different in other embodiments. For example, in an embodiment in which cell site shapes are divided by lines bisecting azimuth directions, such as the embodiment shown in FIG. 10B, end points of a connecting line may be established at cell sites 1002. In another variation, centroids 1012 of cell shapes 1010 may be used as endpoints.

Intersections are counted at S1408. In particular, intersections between connection line 1508 and underlying cell shapes are counted. In FIG. 15, line 1508 intersects cell shapes 1502a, 1502b and 1502c, or three cell shapes. The tier relationship between selected cells is N−1, where N represents the number of cell shapes intersected by the line 1508 between cell points. Therefore, the cells corresponding to cell shapes 1502a and 1502c are determined to be second tier neighbors of one another. Tier data is then stored at S1410.

Figure 16:
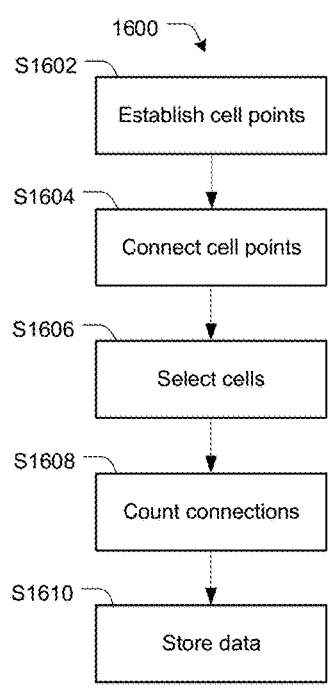
FIG. 16 illustrates a process for determining tier relationships between cells.

FIG. 16 shows a process 1600, which is another embodiment of determining a tier relationship between cells. Cell points are determined at S1602 as discussed above, and the cell points are connected at S1604.

Figure 17:
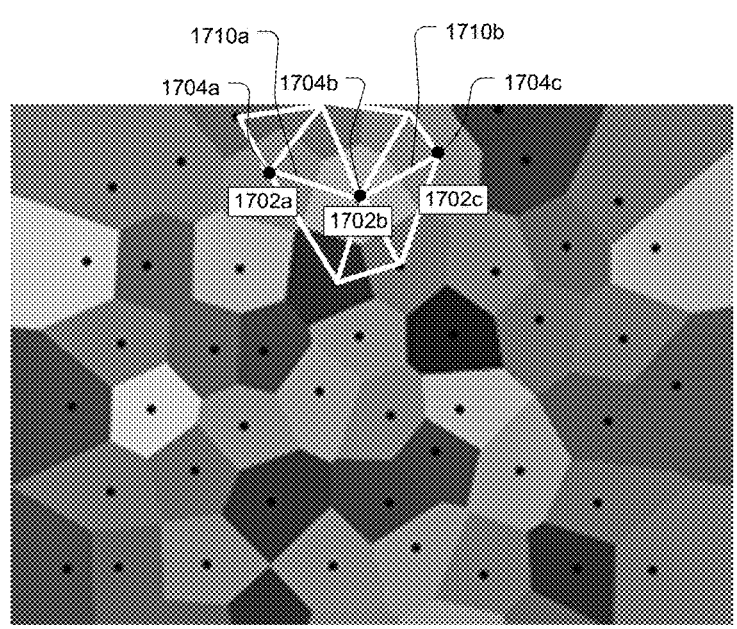
FIG. 17 illustrates tier relationships between cells.

FIG. 17 shows an embodiment in which cell points 1704 are connected to one another by lines 1710. In an embodiment, cell points may be connected to each other by performing Delaunay triangulation on an array of cell points. Delaunay triangulation is a useful technique for connecting cell points by establishing short paths between the cell points.

Cells for which a tier relationship is being determined are selected at S1606. In the embodiment of FIG. 17, cells 1702a and 1702c are selected. A number of connections between these cells is then determined at S1608. In particular, a least number of connections between cells may be determined.

For example, FIG. 17 shows that cell point 1704a can be connected to cell point 1704c through two connections 1710a and 1710b. Counting the number of connections at S1608 determines that two connections are present between the cell points. The least number of connections between cell points corresponds to a tier relationship between the cells, so process 1600 would determine that the cell associated with cell point 1704a is a second tier neighbor of the cell associated with cell point 1704c. This relationship may be stored at one or more device at S1610.

Depending on the activities that tier relationship data supports, it may be sufficient in some embodiments to know the exact number of tiers between cells when the cells are less than or equal to N tiers apart from each other, where N is an integer. If the cells are more than N tiers apart, then it may be sufficient to know they are more than N tiers apart, without knowing exactly how many tiers apart the cells are. In this case, it may be more efficient to pre-compute all the neighbors within the N tiers for each cell.

Figure 18:
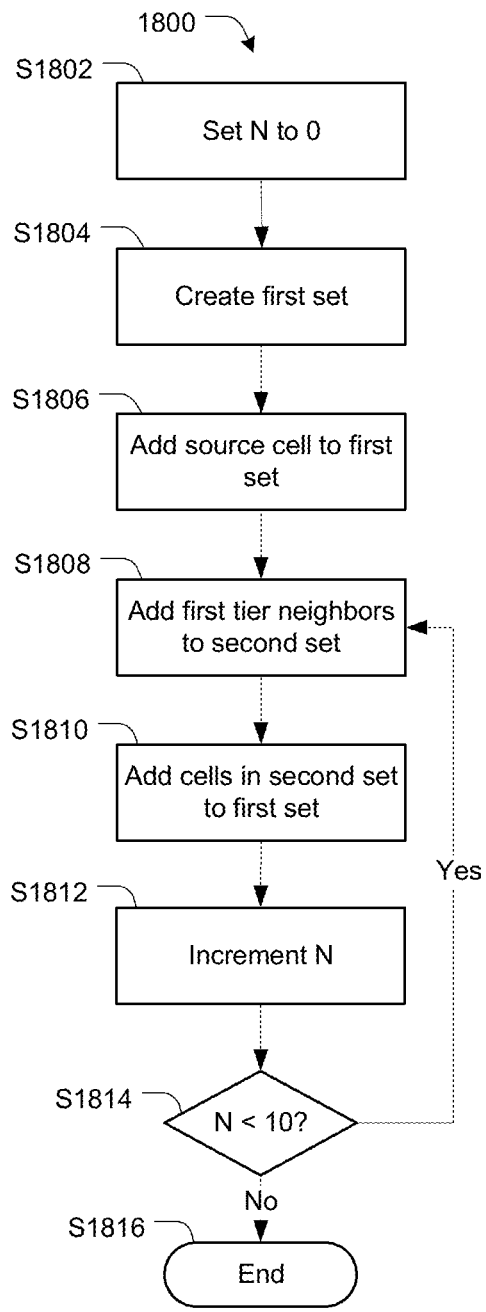
FIG. 18 illustrates a process for determining tier relationships between cells.

An example of a process 1800 for identifying neighbor relationships less than a certain value for a source cell is shown in FIG. 18. In process 1800, the cutoff value for tier relationships is 10.

Integer N is set to 0 at S1802. A first empty set that will be used to hold the first N tier neighbors is created at S1804. The source cell is added to the first set with a tier count attribute of 0 at S1806.

For cells already in the first set that have a tier count attribute equal to N, their first tier neighbors are placed into a second set at 1808. A second set is created for first tier neighbors of cells already in the first set that have a tier count attribute equal to N at S1808. So first tier neighbors of the source cell will be placed in the second set when N=0. Cells in the second set that are not already in the first set are added to the first set at S1810 with a tier count attribute of N+1, and N is incremented by +1 at S1812. S1808 to S1812 are repeated until a specified tier value is reached, which is 10 at S1814 in FIG. 18. Accordingly, process 1800 counts a number of first tier relationships for a first cell, and when compared to a second cell, effectively counts a number of first tier relationships between the first cell and the second cell.

Thus, performing process 1800 will identify all cells that have a neighbor tier relationship of less than or equal to a certain value for a source cell. Process 1800 is provided for illustrative purposes, and other specific embodiments are possible.

Figure 19:
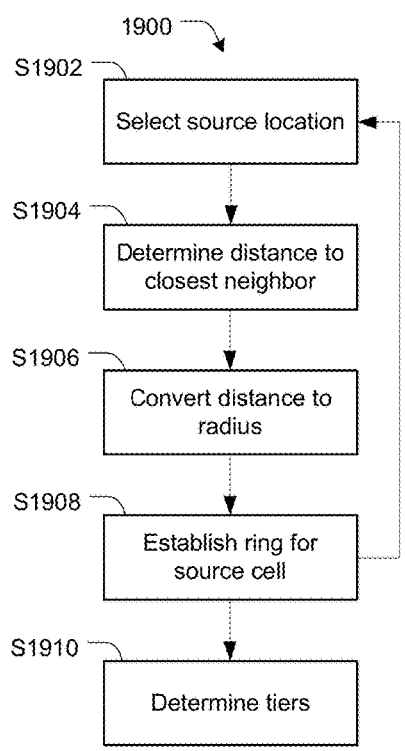
FIG. 19 illustrates a process for determining tier relationships between cells.

FIG. 19 shows another embodiment of a process 1900 for determining a tier relationship between cells. The shapes in process 1900 are circles, or rings. Accordingly, process 1900 may be referred to as a ring process.

A source location is selected at S1902. In an embodiment, the source location may be selected by selecting a cell point such as a cell point 714a of FIG. 7C, or by selecting a cell site such as cell site 502a of FIG. 7C. A cell site may be selected when the cell site is associated with an omnidirectional antenna, or for specific applications such as ANR optimizations.

The distance to a nearest neighbor location is determined at S1904. In an embodiment, the nearest neighbor is a cell that is the closest distance to the source cell that uses the same UTRA Absolute Radio Frequency Channel Number (UARFCN) layer as the source. When the source location is a cell point, the distance may be the distance to the closest cell point that is associated with a different cell site.

Figure 20:
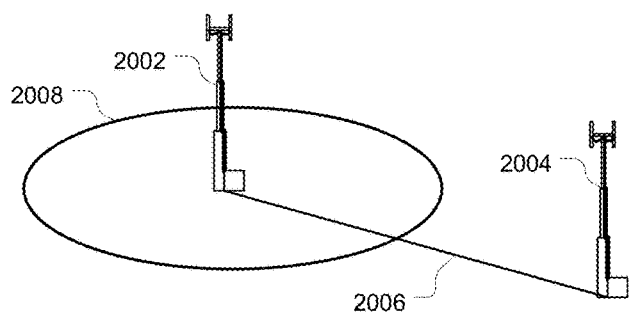
FIG. 20 illustrates determining tier relationships between cells.

However, in other embodiments, cell site locations may be used as source locations. Such an embodiment is shown in FIG. 20, which shows a distance 2006 between source cell site 2002 and nearest neighboring cell site 2004. In an embodiment, a cell site may be used as a proxy for one or more cells that are associated with such a cell site. When the source location is a cell site, the distance may be the distance to the closest cell site that uses a same UARFCN as the source cell site.

The distance 2006 may be converted to a radius value of a ring 2008 by dividing the distance by two. The ring 2008 may be established at S1908 by creating a circle centered at source location 2002 with a radius from S1906. S1902 to S1908 may be repeated as many times as desired for locations in a wireless communications network.

A relationship between a source location 2002 and another location is determined at S1910. The relationship may be determined, for example, by establishing a line between a source location 2002 and a target location, and counting a number of rings 2008 that the line traverses other than the ring of the source location. In such an embodiment, a number of tiers between the source and target locations may be the number of rings other than the source ring.

Process 1900 is a useful alternative to using raw distance values to classify relationships between cell sites and/or individual cells. Raw distance does not account for variations in density, while process 1900 can establish relationships that do account for density. As such, process 1900 and other processes of this disclosure are more robust and useful than raw distance to a variety of cellular network technologies. In a specific embodiment, process 1900 may be used to determine unnecessary or problematic neighbor relations between cells by removing neighbor relations for which the number of tiers from S1910 is greater than a threshold value.

Triangle Edge Removal

The accuracy of neighbor tier determination from triangulation can be improved by removing certain triangle edges from an initial set of triangles. Initial Delaunay triangulation may not identify optimal tier relationships for cells at the outer edges of a network and isolated cells in the middle of a large network. In these cases, Delaunay triangulation may identify cells as being first tier neighbors that would not otherwise be considered to be first tier neighbors by network engineers.

While such cells may geometrically meet the criteria to form a Delaunay triangle, they may be too distant from each other to be considered first tier neighbors. In other cases, such cells may be at the edge of a network, where cells are actually multiple tiers away from each other, but the triangulation identifies an erroneous first tier relationship.

The following disclosure describes a system and method that can be used to examine triangles formed for a given cellular network and to determine whether any of these triangles contain any edges or in other words incorrect first-tier neighbor assignments. There are at least two ways to remedy this problem, either through the complete removal of the triangle meeting any of the criteria explained below or through removal of only the one or more edges of a given triangle that represent those incorrect first tier neighbor assignments. Empirical testing has established that removing particular edges established by Delaunay triangulation results in highly accurate and efficient determination of neighbor tier relationships.

FIG. 21 illustrates a method 2100 for determining neighbor relationships according to an embodiment of the present disclosure. At S2102, cell points of a plurality of cell points are connected using Delaunay triangulation. The cell points may be cell points 1504 or cell points 1704 as explained with respect to FIGS. 15 and 17 above. The cell points may be established using methods explained in this disclosure, or any other methods determine points that represent a geographical location of a cell in a wireless network. FIG. 22 illustrates cell points in a wireless telecommunications network that are connected to one another by Delaunay triangulation.

Applying triangulation at S2102 leads to a set of triangles, where each edge represents a connection between two first-tier neighboring cells. Depending on the location of a given cell, each edge may belong to either only one triangle or may be shared by two triangles. The following elements S2104 to S2110 of process S2100 provide criteria that may be used to identify unwanted or incorrect edges of these triangles.

A distance-based criterion is applied to the Delaunay triangles at S2104 in order to identify edges of the Delaunay triangles that represent incorrect neighbor tier relationships. In particular, the edges that represent incorrect neighbor tier relationships are edges between a first cell and a second cell where a handover operation from the first cell to the second cell is not expected to occur.

For a given set of points, Delaunay triangulation maximizes the minimum angle of all the angles of the triangles in the triangulation and in general avoids the formation of so-called "skinny" triangles. However, when applied to certain network areas such as the outer edges of a cellular network, Delaunay triangulation can result in "skinny"

triangles. Delaunay triangulation may link two cells on the edges of a network that, despite having a direct line of sight on each other, have multiple cells between them, and would normally not be considered to be first-tier neighbors.

A first angle-based criterion is applied to the Delaunay triangles at S2106. In an embodiment, the first angle-based criteria is a middle angle criterion in which the largest edge of triangles whose middle angle is less than a threshold value is identified as a candidate for removal.

A second angle-based criterion is applied to the Delaunay triangles at S2108. In an embodiment, the second angle-based criterion is a minimum angle criterion in which the largest edge of triangles whose minimum angle is less than a threshold value is identified as a candidate for removal.

A third angle-based criterion is applied to the Delaunay triangles at S2110. In an embodiment, the third angle-based criterion is a ratio-based criterion in which a ratio of the smallest angle of a triangle to the largest edge of the triangle is used as a criterion for identifying candidate edges for removal.

The edges that are candidates for removal may be stored in a memory. The memory may be a memory such as memory 202 or storage device 212 of network resource controller 200. The candidates may be stored in a memory in order to perform further operations before removing the edges, such as determining whether an edge that is marked for removal is shared with another triangle. Such an operation is explained in further detail in process 3200.

FIG. 23 illustrates the network diagram of FIG. 22 in which triangle edges identified at S2104, S2106, S2108 and S2110 are represented as gray or lower weight lines.

Edges are removed from the Delaunay triangles at S2112. The edges that are removed may be the edges that are identified by applying distance or angle criteria at one or more of S2104, S2106, S2108 and S2110.

Figure 24:
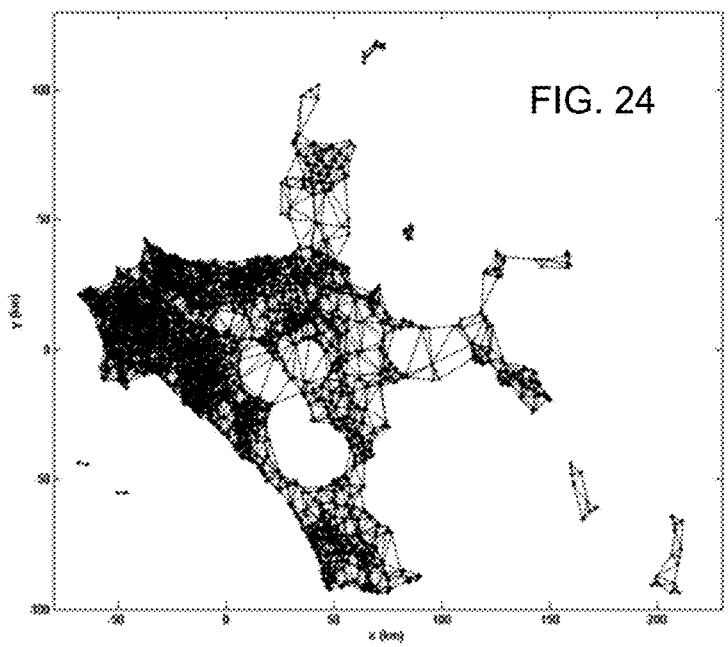
FIG. 24 illustrates a plurality of cell points connected by Delaunay triangulation from which selected edges have been removed.

FIG. 24 illustrates the network diagram of FIG. 23 from which the identified edges have been removed. The remaining lines in FIG. 24 represent first-tier relationships between cells that correspond to the cell points.

Such relationships may be used by a cellular network to add or remove neighbors from neighbor lists. For example, when a neighbor list for a given cell includes a neighbor cell that is connected to the given cell through a neighbor relationship that is determined to be incorrect by process 2100, the neighbor cell may be removed from the neighbor list of the given cell and possibly blacklisted. In another embodiment, cells that are connected to one another by lines of FIG. 24 may be added to each other's neighbor lists. Persons of skill in the art will recognize that other uses may be made of the neighbor relationships determined by process 2100 and shown in FIG. 24.

Figure 25:
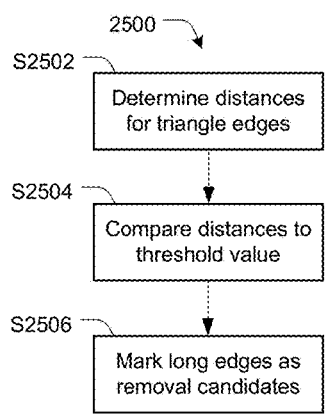
FIG. 25 illustrates a distance-based process for selecting edges for removal.

FIG. 25 shows a process 2500 for applying a distance-based criterion to determine edges that are candidates for removal. Process 2500 corresponds to element S2104 of process 2100 described above. A distance-based criterion may applied because when two cells are separated by a great distance, they are not effectively first-tier neighbors of one another. In particular, when the distance between two cells is too great, a handover operation may not be expected to occur between the two cells.

Distances for the edges of triangles in a triangulated network diagram are determined at S2502. The distances may be linear distances representing the separation in space between cell points, such a number of kilometers between the cell points. In some embodiments, depending on the nature of the network diagram, the distance may be a number of pixels in an edge or some other scaled distance value.

The distance values are compared to a threshold value at S2504. The threshold value may be, for example, 5 kilometers, 15 kilometers, 20 kilometers, or 25 kilometers. Values outside of this range may identify too many or too few edges for removal, limiting the effectiveness of the process.

In an embodiment, the distance value may be different between particular geographical areas. For example, the distance at which a handover may occur is less for a highly dense urban area such as Manhattan than the distance at which a handover may occur in a low density rural area. Accordingly, the threshold distance value may be different for different geographical areas in a network.

Figure 26:
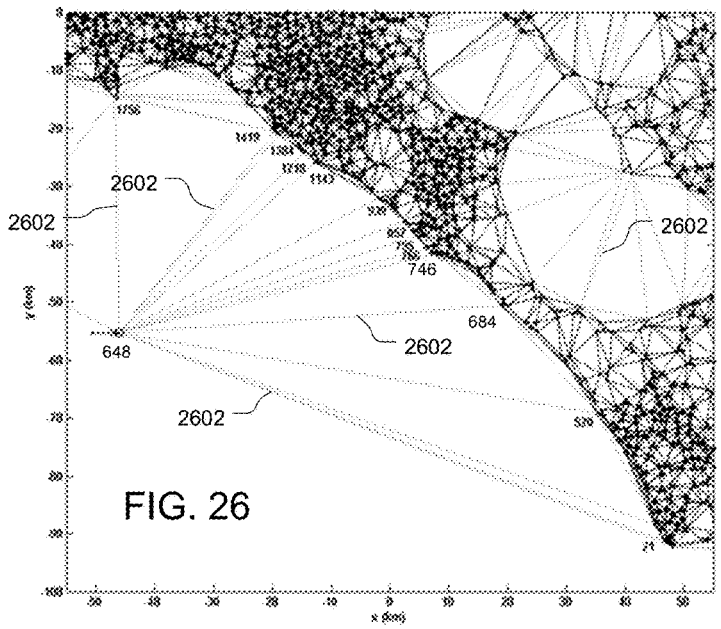
FIG. 26 illustrates a plurality of cell points connected by Delaunay triangulation in which selected edges are designated for removal using a distance-based method.

Edges that are greater than the threshold value are marked as removal candidates at S2506. FIG. 26 illustrates a zoomed-in perspective of a portion of the network diagram shown in FIG. 23. In FIG. 26, edges 2602 that connect cell point 648 exceed the threshold distance value and are marked for removal as shown by the gray lines connecting cell point 648 to cell points on the edge of a higher density portion of the network. Other edges 2602 that fail the distance criterion are similarly indicated in gray on FIG. 26.

In an embodiment, marking an edge as a removal candidate may include recording an identifier of the associated triangle in a database of "damaged" triangles. This database may be used in subsequent processes to determine whether to remove edges that are shared between two triangles. Recording "damaged" triangles in a database may be performed for all triangles for which an edge is marked for removal, regardless of whether the edge was identified for removal through a distance-based process or an angle-based process.

Figure 27:
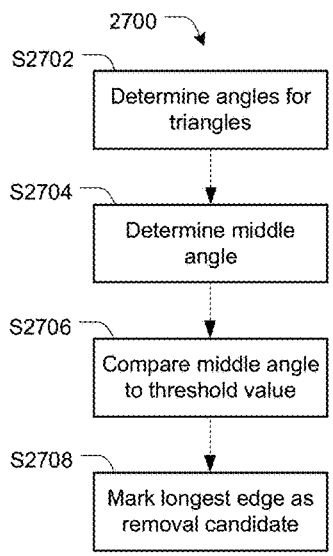
FIG. 27 illustrates an angle-based process for selecting edges for removal.

FIG. 27 shows a process 2700 for applying an angle-based criterion to determine edges that are candidates for removal. Process 2700 corresponds to S2106 of process 2100 described above.

Figure 28:
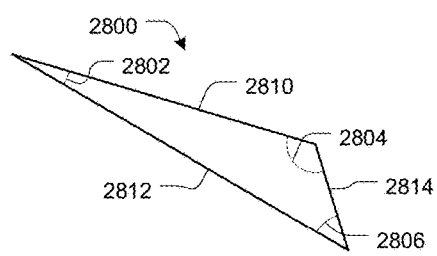
FIG. 28 illustrates an asymmetrical triangle.

Values for angles of the triangles are determined at S2702. The values for each triangle are compared to one another at S2704 to determine which angle is the middle angle. For example, with respect to the triangle 2800 of FIG. 28, values of angles 2802, 2804 and 2806 are compared to each other to determine that angle 2806 has the middle angle value.

The value of middle angle 2806 is compared to a threshold value, and if the middle angle is less than the threshold value, the longest edge 2812 of the triangle 2800 is marked as a removal candidate. The threshold value may be, for example, 10 degrees, 12 degrees or 15 degrees. Values outside of this range may identify too many or too few edges for removal, limiting the effectiveness of the process.

Figure 29:
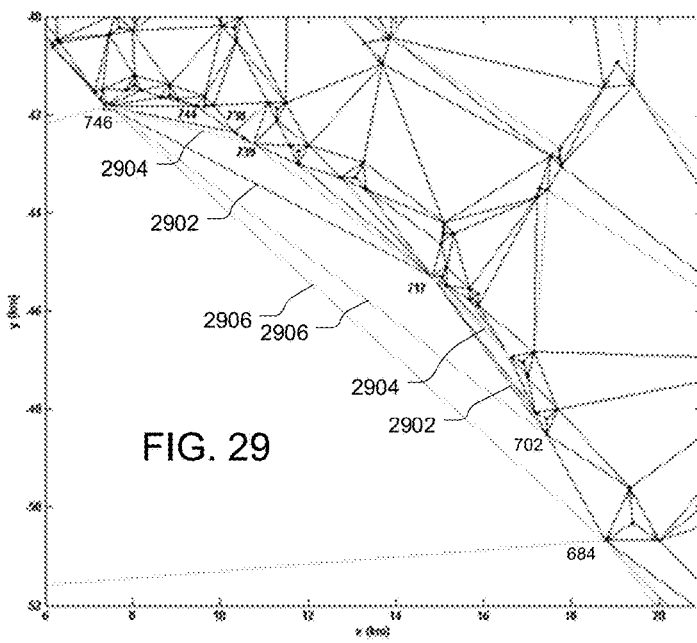
FIG. 29 illustrates a plurality of cell points connected by Delaunay triangulation in which selected edges are designated for removal using an angle-based method.

FIG. 29 shows a telecommunications network in which cell points have been connected to one another by Delaunay triangulation. FIG. 29 magnifies an area of FIG. 26. Process 2700 has been applied to the triangles of FIG. 29, and triangle edges 2902 were marked for removal at 2708.

Figure 30:
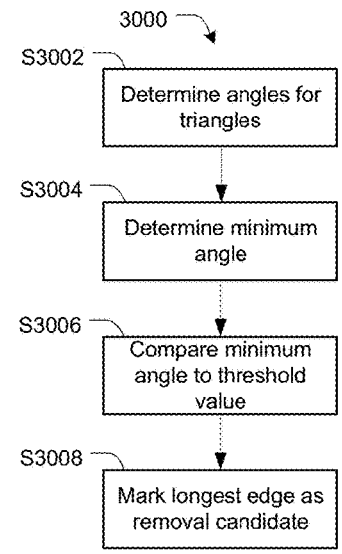
FIG. 30 illustrates an angle-based process for selecting edges for removal.

FIG. 30 shows a process 3000 for applying a minimum angle-based criterion to determine edges that are candidates for removal. Process 3000 corresponds to element S2108 of process 2100 described above.

Values for angles of the triangles are determined at S3002. The angles for each triangle are compared to one another, and the minimum angle 2802 is determined at S3004. A value of the minimum angle is compared to a threshold value at S3006, and if the angle is less than the threshold value, then the longest edge 2812 of the triangle is marked for removal at S3008. Examples of threshold values that may be used at S3006 include two degrees, three degrees, and four degrees. Values outside of this range may identify too many or too few edges for removal, limiting the effectiveness of the process.

Process 3000 has been applied to the triangles of FIG. 29. In that figure, edges 2904 were identified at S3006, and marked for removal at S3008.

Figure 31:
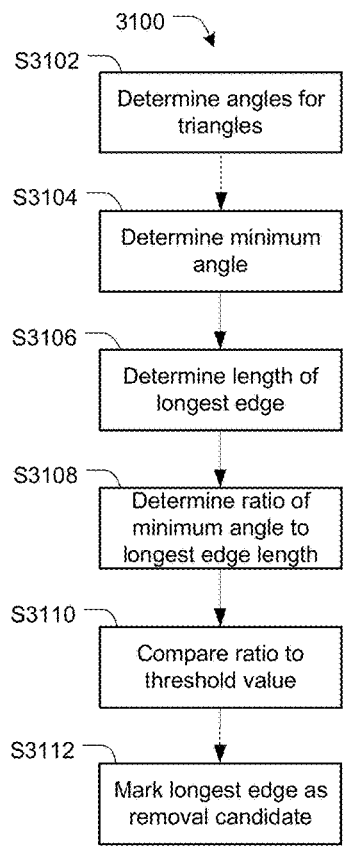
FIG. 31 illustrates an angle-based process for selecting edges for removal.

FIG. 31 shows a process 3100 for applying a ratio-based criterion to determine edges that are candidates for removal. Process 3100 corresponds to element S2110 of process 2100 described above. This criterion attempts to locate skinny triangles with emphasis on those with longer edges. Those are usually the ones more likely to be incorrect, involving cells that are too far from each other to be neighbors.

Values for angles of the triangles are determined at S3102. The angles for each triangle are compared to one another, and the minimum angle 2802 is determined at S3104. The distance of the longest edge 2812 of each triangle is determined at S3106, and a ratio of the minimum angle 2802 to the length of the longest edge 2812 is determined at S3108.

The ratio of the smallest angle 2802 to the length of the longest edge 2812 is compared to a threshold value at S3110. When the length of the longest edge 2802 is expressed in kilometers and the smallest angle is expressed in degrees, a suitable threshold value may be 1.2, 1.5, or 2.0. Values outside of this range may identify too many or too few edges for removal, limiting the effectiveness of the process. The longest edge of a triangle whose ratio is less than the threshold value is marked as a candidate for removal at S3112.

While angle-based processes 2700, 3000 and 3100 have been described as marking a longest edge of a triangle for deletion, in some embodiments, the two longest edges may both be marked as removal candidates. In an embodiment, an additional threshold may apply to this situation. For example, a length of a shortest edge 2814 may be compared to a threshold value, a ratio between the two longest edges may be compared to a threshold value, a ratio of a longest edge to a shortest edge can be compared to a threshold value, etc. Other embodiments are possible within the scope of the present disclosure.

Figure 32:
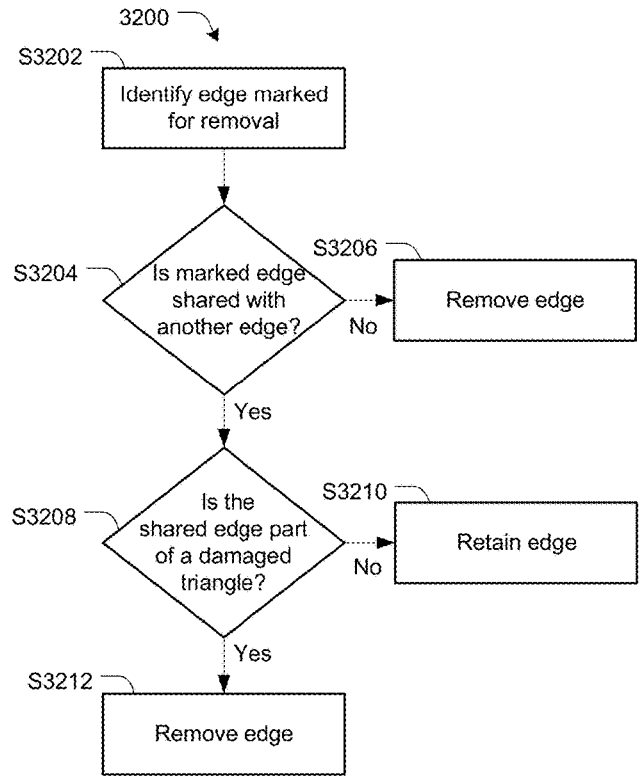
FIG. 32 illustrates a process for removing edges.

FIG. 32 shows a process 3200 for removing edges from triangles with edges marked for removal. In an embodiment, process 3200 may be applied at S2112.

At S3202, an edge of a triangle that is marked for removal is identified. The edge may be any edge that is marked for removal as a result of a distance or angle-based edge removal process, such as processes 2500, 2700, 3000 and 3100.

Figure 33:
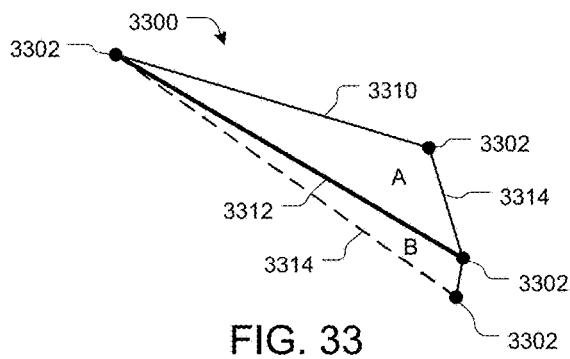
FIG. 33 illustrates a plurality of cell points connected by Delaunay triangulation in which selected edges are designated for removal.

In some situations, an edge is shared between two triangles. For example, as seen in FIG. 33, while both of triangles A and B are independently established between a plurality of cell points 3302, triangles A and B share edge 3312 as indicated by the thicker line. Accordingly, determining whether a marked edge is shared with another edge at S3204 would result in a "yes," proceeding to S3208. When an edge that is marked for removal is not shared with another triangle, that edge is removed at S3206.

S3208 determines whether the shared edge is shared with a "damaged" triangle, which is a triangle that has at least one edge marked for removal. In an embodiment, when the shared edge is shared with a damaged triangle, the shared edge is removed at S3212. In another embodiment, the shared edge is only removed at S3212 when the specific edge is marked as a candidate for removal in both triangles. When the edge is removed, it is removed completely from the network. In other words, the shared edge is removed from both of the triangles that share the edge.

In still another embodiment, a triangle is only considered to be a "damaged" triangle when an edge has already been removed from the triangle. An edge may have already been removed from a triangle, for example, if a marked edge was determined not to be shared with another triangle at S3204, or if it failed the distance criterion of process 2500. In such an embodiment, shared edges are removed at S3212.

Edge 3314 of triangle B of FIG. 33 is represented by a dashed line, which indicates that the edge is marked as a candidate for removal. Therefore, in an embodiment, shared edge 3312 would be removed from both of triangles A and B at S3212. In another embodiment, because edge 3314 is not shared between triangles A and B, it would be retained at S3210.

Elements of process 3200 can be seen in FIG. 29 and FIG. 26. FIG. 29 shows a zoomed-in segment of the network of FIG. 26 along a geographical boundary. For the cell site marked as cell 746, there are a number of incorrect first-tier neighbor assignments due to skinny triangles resulting from Delaunay triangulation. In this example, the edge connecting cell 746 with 684 is also part of the triangle connecting these two cells with cell 648, as shown in FIG. 26.

As a result of the removal of edges in the triangle <648,746,684> of FIG. 26, the remaining edge <746,684> is a "damaged" triangle. Therefore, when the angle criteria are applied and the same edge is marked for removal from triangle <746,684,702>, it will also be removed from the "damaged" triangle and therefore the connection (or in other words, the neighbor assignment) between cells 746 and 684 will be completely removed.

Three Dimensional Mapping

Although wireless networks are often represented in two dimensions, the actual network components exist in three dimensional space. Thus, a two-dimensional plot of cellular network components is limited in how accurately it can represent relationships between network elements.

For a limited network area, a simple sinusoidal projection has been used to convert the geographic coordinates to 2-dimensional Cartesian coordinates as expressed in Equation 1:

$$x = 111 \cdot \cos \varphi (\lambda - \lambda_m)$$

$$y = 111 \cdot (\varphi - \varphi_m) \qquad \text{[Equation 1]}$$

In Equation 1, $(\varphi, \lambda)$ are the latitude and longitude of a given cell, $(\varphi_m, \lambda_m)$ are the average latitude and longitude of all the cells in a given network, and 111 (km) is the approximate distance between two points on the face of the earth with the same longitude and 1 degree of latitude apart. In the standard geographic coordinate system, the actual length of a degree of latitude varies from 110.574 km at 0 degree latitude to 111.694 km at 90 degrees latitude.

In addition, the distance between two points that are 1 degree of longitude apart from one another is 111.3 km at the equator. As latitude is increased from 0, this distance is reduced by a factor of $\cos \varphi$ of the given latitude.

While a two dimensional projection works with reasonable accuracy for relatively small areas, it is not a universal solution. As the size of a network area increases, the accuracy of two-dimensional projection decreases.

In larger network areas, a two dimensional projection will no longer correctly represent the actual locations of and distances between cell sites in the coverage area of a cellular network. This is mainly due to the fact that over large areas, the curvature of the earth can no longer be considered insignificant and the flat earth model is no longer accurate. Larger areas may be areas on the scale of hundreds of square kilometers or more, such as the area of a metropolitan area, county, state, nation, etc.

Thus, in an embodiment of this disclosure, network relationships are determined from three dimensional data. For example, cells may be represented in a three-dimensional space, and first-tier neighbor relations may be determined using, for example, a 3D Convex Hull of the network or the 3D Delaunay triangulation of all the cells in the same space.

These two techniques—3D Convex Hull and 3D Delaunay triangulation—will be explained in further detail in this disclosure in order to clearly explain specific embodiments. However, the scope of this disclosure is not limited to these two particular techniques. It should be recognize that other techniques for establishing a three-dimensional representation of network element relationships are possible.

Figure 34:
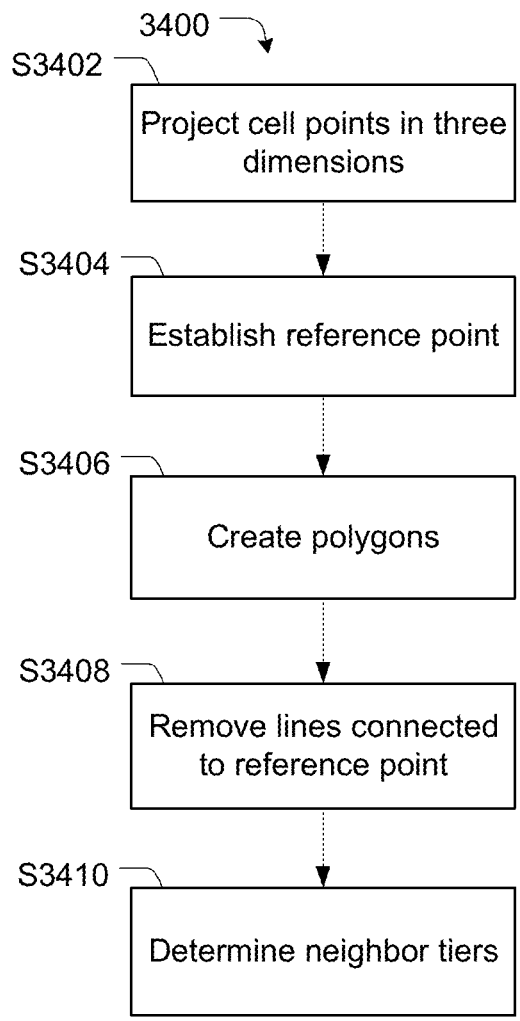
FIG. 34 illustrates a process for determining neighbor tier relationships between cells in three-dimensional space.

FIG. 34 shows an embodiment of a process 3400 for determining neighbor tier relationships between cells in three-dimensional space. Cell points are projected onto three dimensional space at S3402. Projecting cell points onto three dimensional space may be accomplished according to the following Equation 2:

$x = R \cdot \cos \varphi \cdot \cos \lambda.$ $y = R \cdot \cos \varphi \cdot \sin \lambda.$ $z = R \cdot \sin \varphi.$ [Equation 2]

In Equation 2, R is the earth's radius in km, $\varphi$ is the latitude of a cell, and $\lambda$, is the longitude of the cell.

Figure 35:
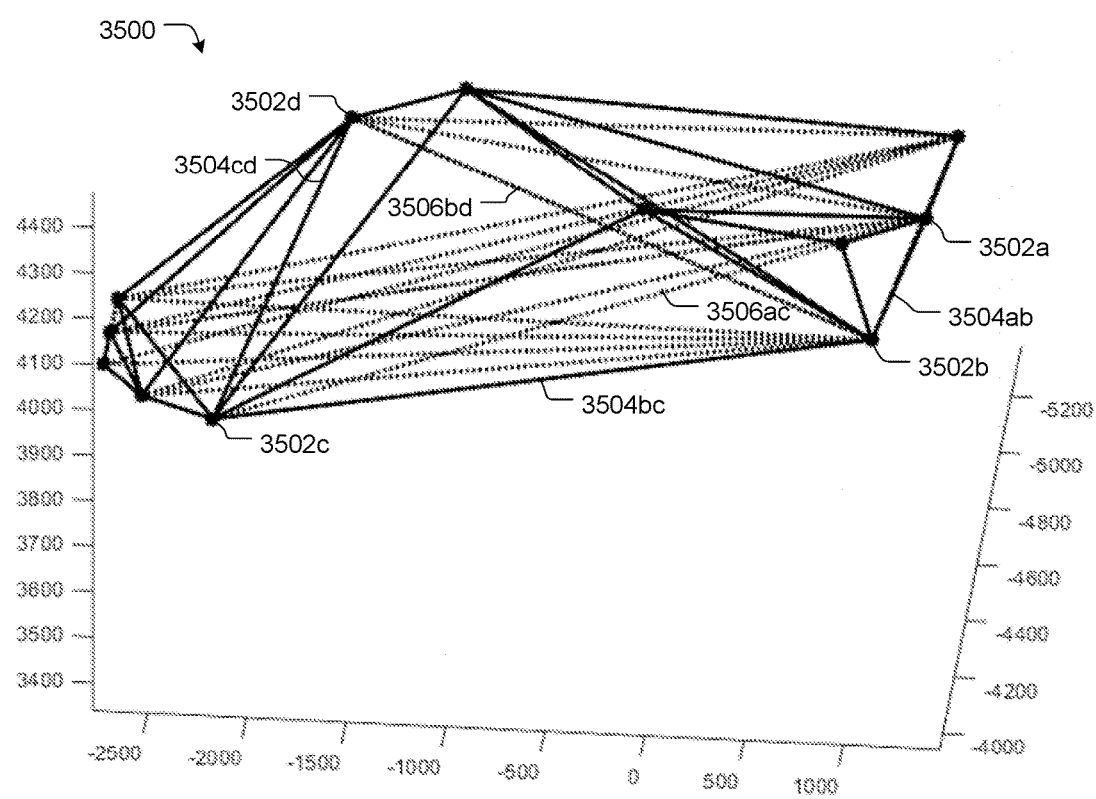
FIG. 35 illustrates a projected map of a set of cell points in three dimensional space.

FIG. 35 shows an example of a projected map 3500 of a set of cell points 3502 in three dimensional space. In FIG. 35, each of the cell points 3502 is a point in space that represents the location of a particular cell in accordance with an embodiment of this disclosure. For example, each point may be a centroid of a cell shape, a base station location, or a point a certain distance along an azimuth from a base station.

A 3D Delaunay triangulation has been applied to the cell points 3502 in FIG. 35. The triangulation results in a plurality of lines 3504 that are accurate representations of first tier neighbor relationships between the cell points. For example, line 3504bc between cell points 3502b and 3502c and line 3504cd between cell points 3502c and 3502d are accurate representations of first tier relationships between the respective cells.

In addition, the 3D triangulation of cell points 3502 of FIG. 35 results in a plurality of lines 3506 that are not accurate representations of first tier neighbor relationships. For example, line 3506ac connecting cell points 3502a and 3502c and line 3506bd between cell points 3502b and 3502d connect cell points at the edges of a network that would not be expected to hand over directly to one another. In FIG. 35, accurate lines 3504 are represented by solid lines, while inaccurate lines 3506 are represented by broken lines.

3D Delaunay triangulation of cell points 3502 results in a plurality of tetrahedrons, each connecting four cells in three dimensional space. The tetrahedrons have edges connecting two cell points 3502 that go directly through the surface of the earth. These edges represent incorrect first-tier neighbor assignments and may be removed.

Connecting cell points 3502 using a 3D Convex Hull operation results in a three dimensional surface encompassing the cellular network. This surface is made up of triangles, each connecting three cell points 3502 in the network. However, some of the triangles will wrap around the three dimensional representation of the network from the bottom, thereby connecting cells that are far apart from one another at the outer edges of the network, resulting in incorrect first-tier neighbor relationships.

It is desirable to have a technique to readily discriminate between accurate lines 3504 and inaccurate lines 3506. In order to remove inaccurate lines 3506, it would be helpful to identify a characteristic that all of the inaccurate lines 3506 share with one another that is not found in accurate lines 3504. However, using characteristics such as distance and elevation would employ a complex algorithm to minimize false positives, and would likely result in either retaining a portion of inaccurate lines 3506 or removing some portion of accurate lines 3504.

Figure 36:
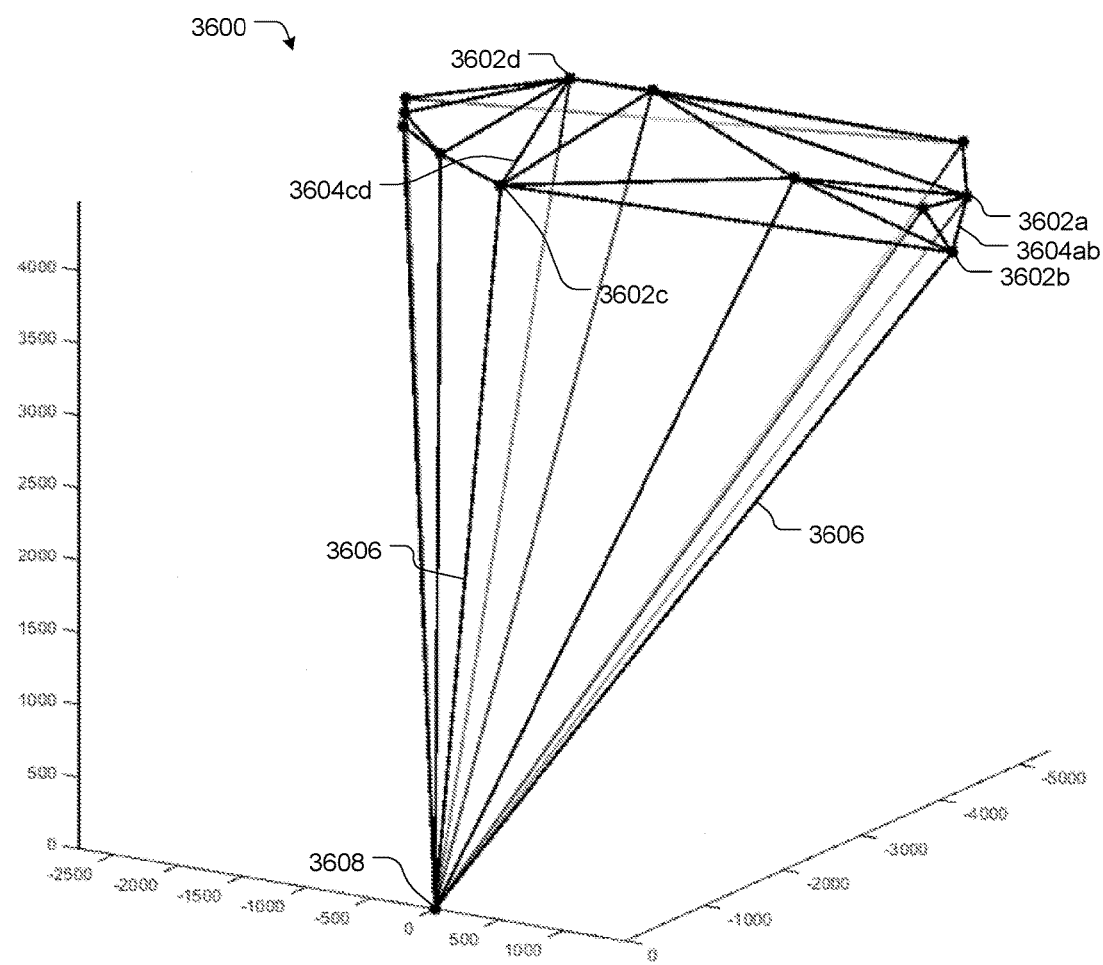
FIG. 36 illustrates an embodiment of a three dimensional projected map with a reference point.

In order to readily distinguish between accurate lines 3504 and inaccurate lines 3506, a reference point may be established at S3404. FIG. 36 shows an embodiment of a three dimensional projected map 3600 of the same network sector as FIG. 35. In addition to the plurality of cell points 3602, map 3600 includes a reference point 3608.

When polygons are created between cell points at S3406, polygons at the edges of a network area connect to the reference point 3608. The reference point 3608 is a property shared by a plurality of inaccurate lines 3606. The inaccurate lines 3606 connecting to the reference point 3608 are removed at S3408, thereby efficiently removing lines connecting to cell points 3602 at the edge of the network area. The reference point 3608 does not represent a cell, base station, or other network element. Rather, the reference point 3608 provides a common criterion for edge removal.

The coordinates of the reference point created at S3404 may vary between embodiments. In one embodiment, the reference point is located at the center of a sphere on which the cell points are projected, or [0,0,0] in 3D Cartesian coordinates. However, the reference point could be located at other positions in other embodiments.

In general, the reference point should be located at a distance sufficiently far from any of the cell points so that when polygons are established between the cell points, the cell points at the edge of a network area connect to the reference point instead of wrapping around to other cell points on the network edge. In an embodiment in which the cell points are projected onto the surface of a sphere, the reference point may be located below the surface of the sphere.

In an embodiment, the reference point is a point which is outside of a space bounded by the polygons connecting the cell points. In other words, if the polygons created at S3406 are used to create a solid shape such as the shapes shown in FIGS. 37A and 37B, the reference point is not contained within those solids. For example, compare the shapes of FIGS. 37A and 37B, which do not use a reference point, to the shapes of FIGS. 38A and 38B, respectively. In FIGS. 38A and 38B, the reference points are outside of a space bounded by the polygons of FIGS. 37A and 37B.

In addition, the reference point may be selected so that only cell points on the solid that correspond to an edge of the network are visible to the reference point. Thus, when a mesh is applied to the reference point and the cell points, all lines to the reference point connect to cell points at the edge of the network. Such points can be removed without affecting the first tier neighbor relationships represented by the mesh.

Creating polygons at S3406 may be accomplished in different ways for different embodiments. In one embodiment, the cell points are connected by 3D Delaunay triangulation. In another embodiment, the cell points are connected by creating a 3D Convex Hull across the cell points, including the reference point. 3D Delaunay triangulation creates a plurality of tetrahedrons which all connect to the reference point. Creating a 3D Convex Hull results in a plurality of triangles that define a surface of the network, and triangles at the edge of the network connect to the reference point.

Regardless of the particular technique used to connect cell points, the edges that connect to the reference point are removed at S3408. Subsequently, neighbor tiers may be determined between any two cell points at S3410 by counting the number of lines between the two cell points, where the number of lines corresponds to a number of tiers between the cell points. In another embodiment, a number of cell polygons which are crossed by lines between two cell points are counted, and the number of cell polygons corresponds to a number of tiers between the cell points.

Figure 37A:
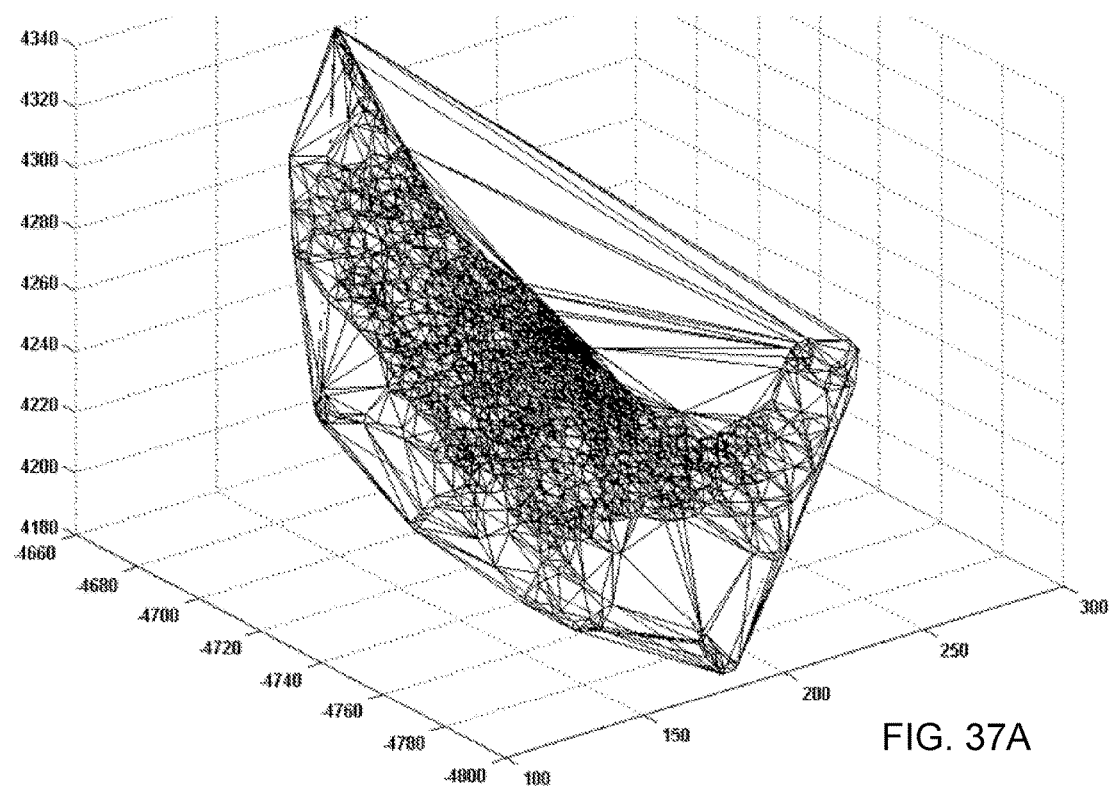
FIGS. 37A and 37B illustrate three dimensional maps of a Convex Hull and a Delaunay triangulation, respectively, of a plurality of cell points in a network area.
Figure 37B:
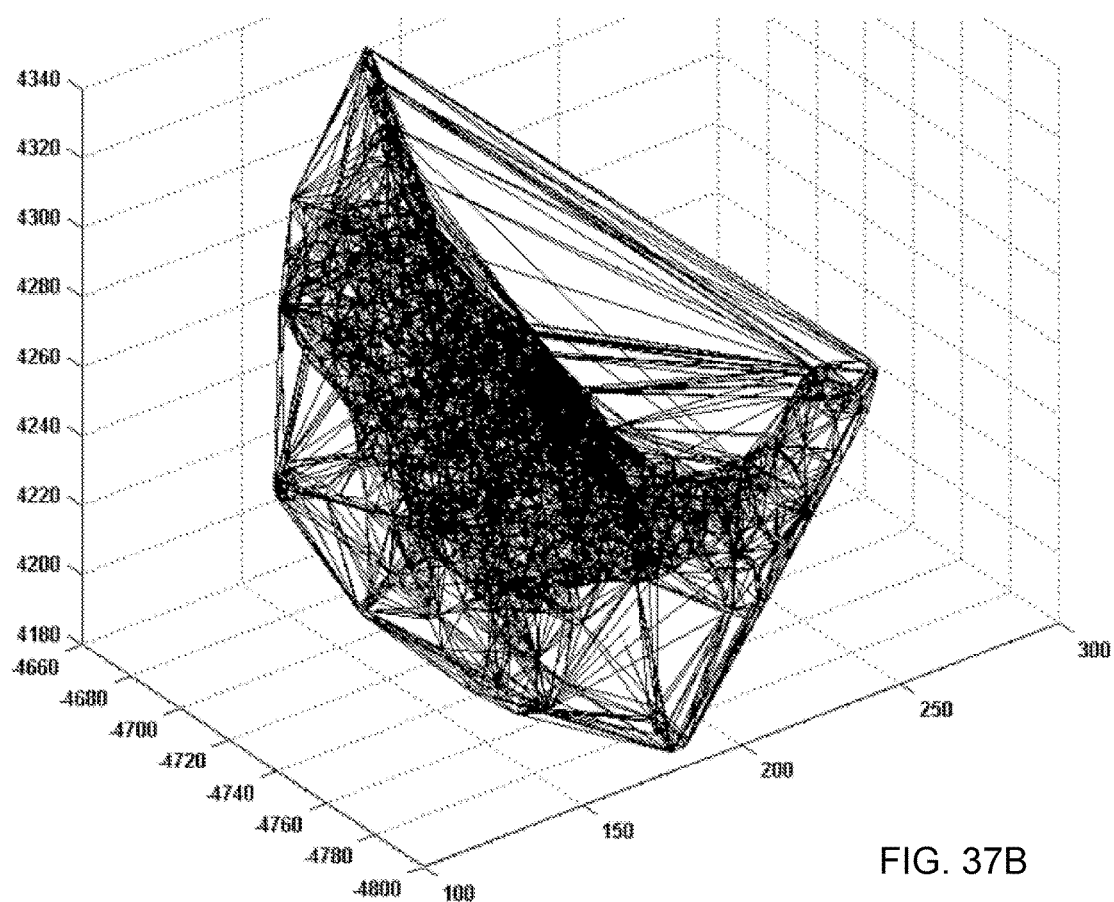
Figure 38A:
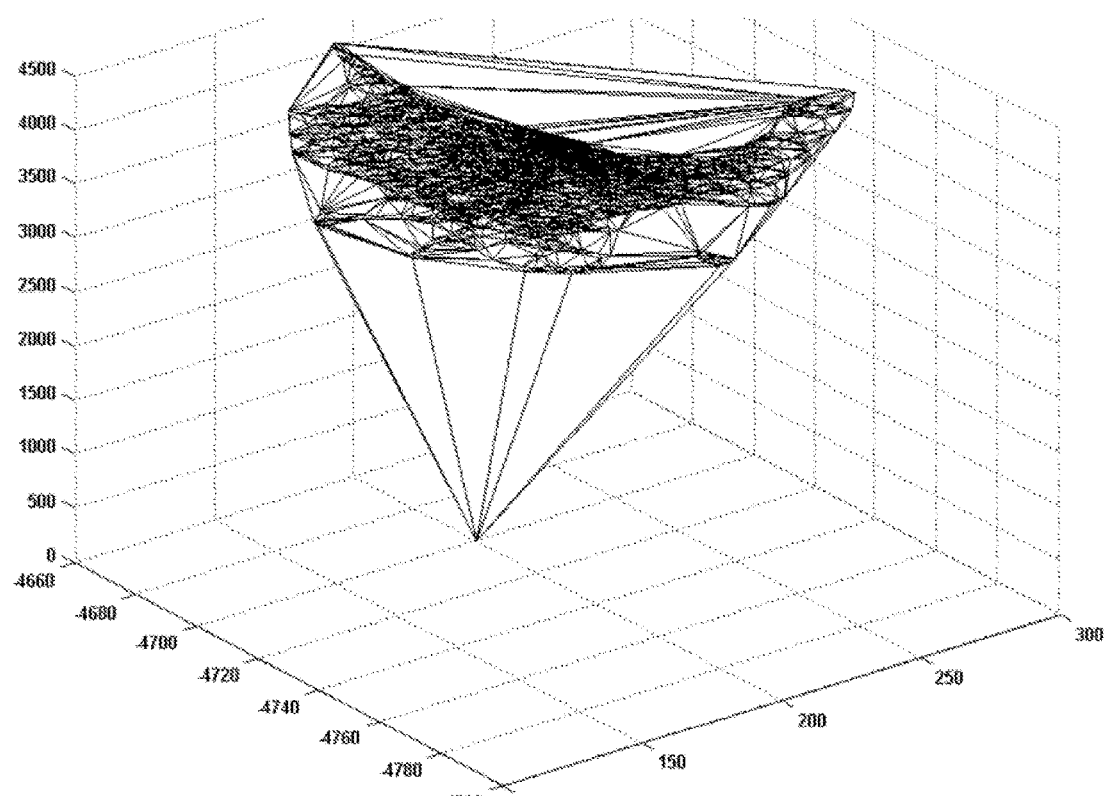
FIGS. 38A and 38B illustrate three dimensional maps of a Convex Hull and a Delaunay triangulation, respectively, of a plurality of cell points in a network area using reference points.
Figure 38B:
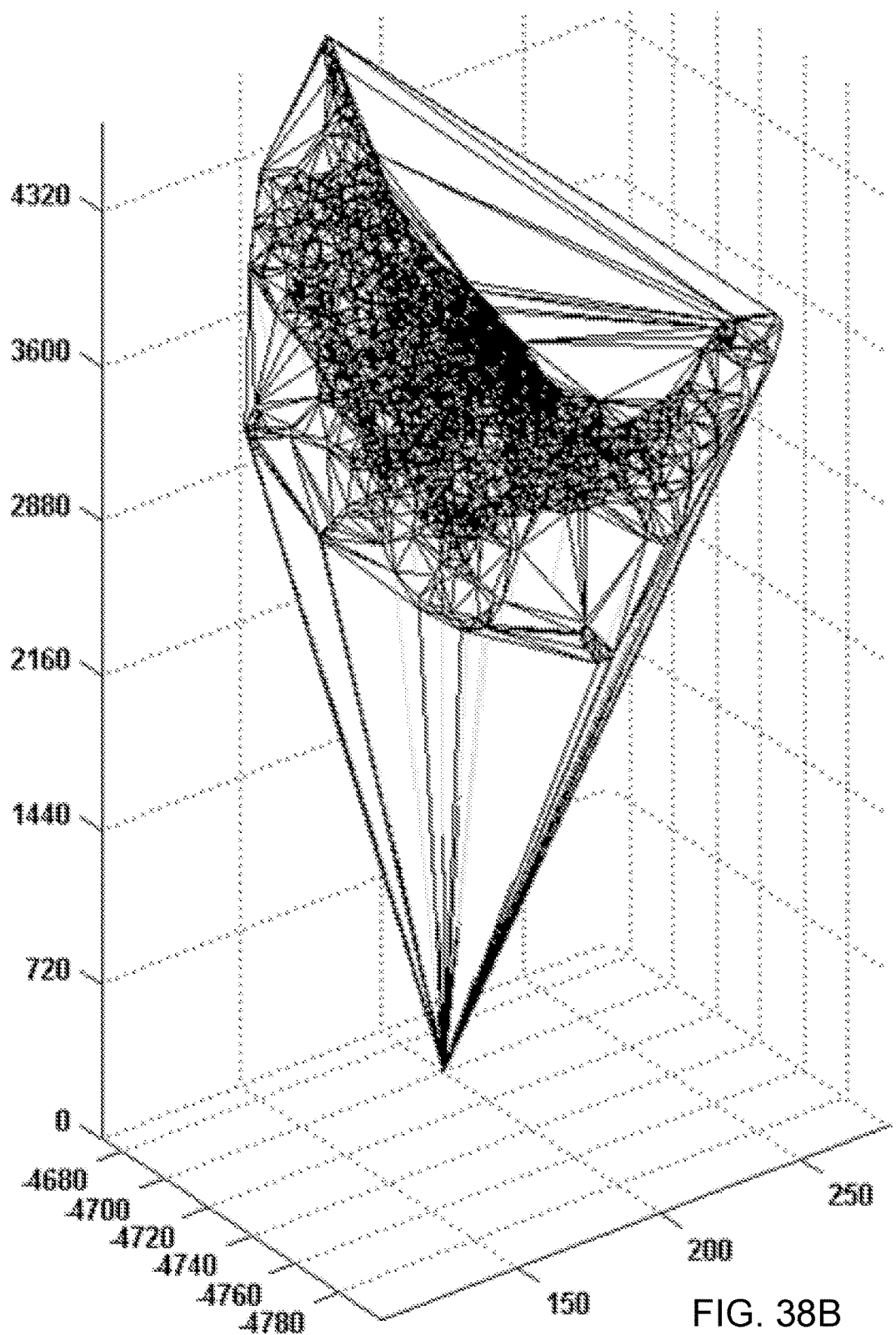

To help illustrate embodiments of process 3400, FIG. 37A and FIG. 37B show three dimensional maps of a Convex Hull and a Delaunay triangulation, respectively, of a plurality of cell points in a network area. The maps were created by translating a plurality of cell point locations into three dimensional coordinates on a sphere with the radius of the earth according to Equation 2. The cell points were then connected by creating a 3D Convex Hull in the case of FIG. 37A, and by 3D Delaunay triangulation in the case of FIG. 37B. Accordingly, FIG. 37A and FIG. 37B each have a number of lines that represent inaccurate neighbor relationships.

FIG. 38A and FIG. 38B show the maps of FIG. 37A and FIG. 37B, respectively, that were meshed using a reference point located at a different elevation from the surface of the sphere onto which the cell points were mapped. The reference point used to create FIG. 38A and FIG. 38B is the center of the sphere, or [0,0,0].

Figure 39A:
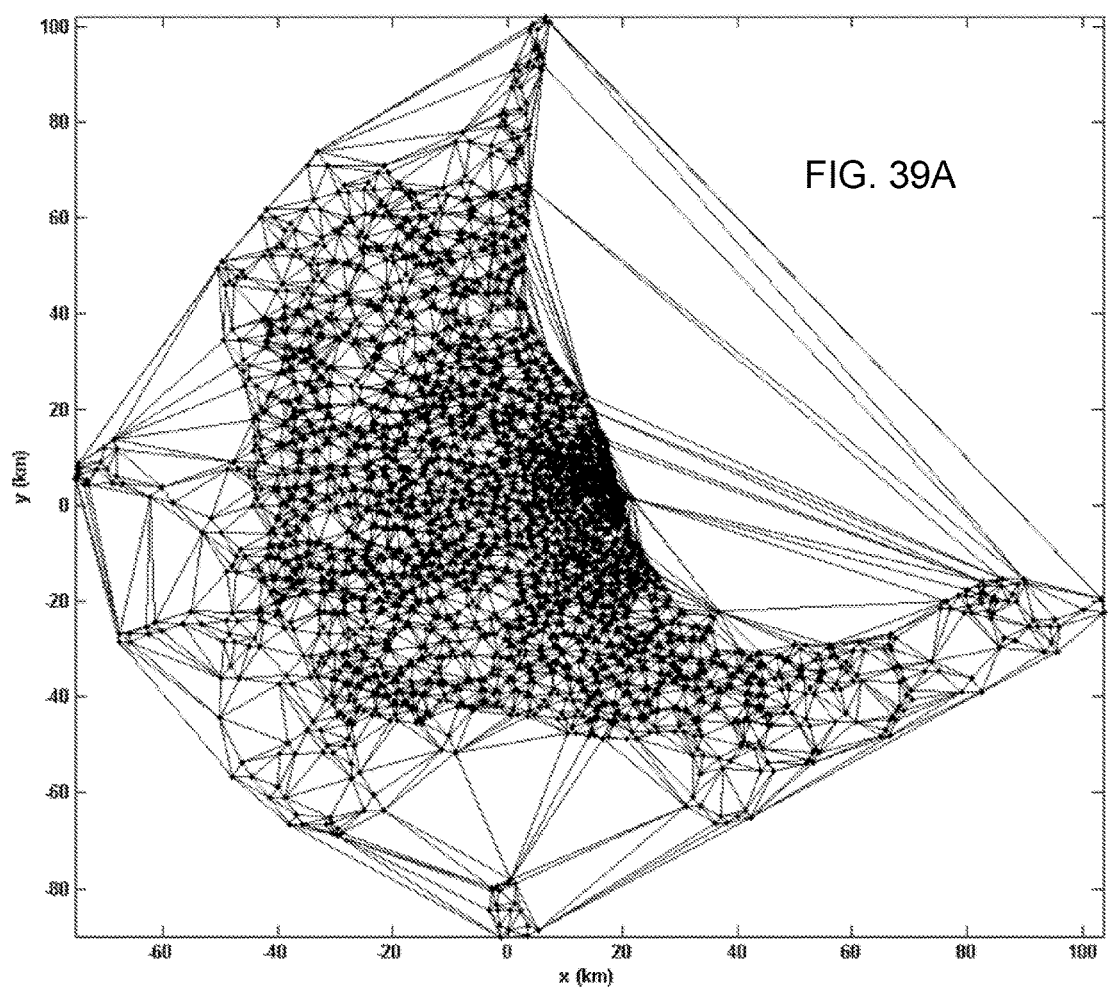

FIG. 39A and FIG. 39B show the maps of FIG. 38A and FIG. 38B, respectively, after polygon edges that extend to the reference point have been removed. The maps of FIG. 39A and FIG. 39B were created by taking the lines, or first tier relationships, that remained after removing the lines connected to the reference point, and connecting the same cell points of a two dimensional array as the three dimensional array.

Process 3400 may be performed in addition to other techniques. For example, process 3400 may be performed in conjunction with process 2100 to provide an accurate set of neighbor tier relations.

The first-tier neighbor relations found through process 3400 may be used to count the number of tiers between any two cells in a network. These tier-counts may be used at each base station to create a list of neighboring cells with their corresponding tier counts, which will then be used by mobile terminals for handover purposes. In addition, tier-counts determined according to process 3400 may be used to identify incorrectly placed cells on existing neighbor lists, such as neighbors that appear due to overshooting, and apply an antenna tilt to correct the overshooting.

Embodiments of this disclosure may be used to determine which cells should be added to and removed from cellular neighbor lists; to determine what priority should be assigned to cells on neighbor lists; to disambiguate reuse codes that are detected by mobile devices in cellular networks; to set handover parameters and threshold values which are used for operations such as handovers and load balancing operations; and to classify cell types in networks into core cells and edge cells, where core cells have a coverage area surrounded by many other cells' coverage areas and edge cells have coverage areas that extend well beyond the areas served by the core cells.

For example, a system for initializing neighbor lists for new cells in cellular networks may use the first and second tier neighbors of a first cell identified by embodiments of this disclosure as the cells to be placed on the initial neighbor list of the first cell. Elements of this disclosure may affect a handover operation.

What is claimed is:

1. A method for determining relationships in a telecommunications network, the method comprising:
   translating a plurality of cell points into three dimensional coordinates by establishing a 3D convex hull that comprises a plurality of triangles that define a surface of the network;
   establishing a reference point;
   creating a plurality of polygons connecting triangles disposed at the edge of the network to the reference point;
   removing edges of polygons that connect to the reference point;
   determining a plurality of neighbor tier relationships from remaining polygon edges; and
   performing a handover operation or adjusting an antenna based on the plurality of neighbor tier relationships,
   wherein creating the plurality of polygons includes establishing a 3D convex hull using the plurality of cell points and the reference point.

2. The method of claim 1, wherein creating the plurality of polygons includes performing Delaunay triangulation on the plurality of cell points and the reference point.

3. The method of claim 1, wherein the cell points represent cells of a cellular telecommunications network.

4. The method of claim 3, wherein a location of the reference point is outside of a space bounded by the cell points.

5. The method of claim 4, wherein translating the plurality of cell points includes translating the plurality of cell points into points on a surface of a sphere.

6. The method of claim 5, wherein the reference point is beneath the surface of the sphere.

7. The method of claim 5, wherein the reference point is the center of the sphere.

8. The method of claim 1, wherein the cell points represent base stations.

9. The method of claim 1, wherein translating the plurality of cell points includes converting latitude and longitude coordinates for the plurality of cell points into three dimensional coordinates.

10. The method of claim 1, wherein the reference point is located under the surface of the earth.

11. A network resource controller in a wireless telecommunications network, the controller comprising:
    a memory;
    a processor; and
    a non-transitory computer readable medium with executable instructions stored thereon which, when executed by the processor, perform the following operations:
    translating a plurality of cell points into three dimensional coordinates by establishing a 3D convex hull that comprises a plurality of triangles that define a surface of the network;
    establishing a reference point;
    creating a plurality of polygons connecting triangles disposed at the edge of the network to the reference point;
    removing edges of polygons that connect to the reference point;

determining a plurality of neighbor tier relationships from remaining polygon edges; and performing a handover operation or adjusting an antenna based on the plurality of neighbor tier relationships.

12. The network resource controller of claim 11, wherein creating the plurality of polygons includes performing Delaunay triangulation on the plurality of cell points and the reference point.

13. The network resource controller of claim 11, wherein the cell points represent cells of a cellular telecommunications network.

14. The network resource controller of claim 13, wherein a location of the reference point is outside of a space bounded by the cell points.

15. The network resource controller of claim 14, wherein translating the plurality of cell points includes translating the plurality of cell points into points on a surface of a sphere.

16. The network resource controller of claim 15, wherein the reference point is beneath the surface of the sphere.

17. The network resource controller of claim 15, wherein the reference point is the center of the sphere.

18. The network resource controller of claim 11, wherein the cell points represent base stations.

19. The network resource controller of claim 18, wherein translating the plurality of cell points includes converting latitude and longitude coordinates for the plurality of cell points into three dimensional coordinates.

20. The network resource controller of claim 11, wherein the reference point is located under the surface of the earth.

* * * * *